United States Patent [19]
Chuang

[11] Patent Number: 5,919,018
[45] Date of Patent: Jul. 6, 1999

[54] LOCKING FASTENER

[76] Inventor: Roy Joyu Chuang, 5601 W. 97th St., Overland Park, Kans. 66207

[21] Appl. No.: 09/063,976

[22] Filed: Apr. 21, 1998

Related U.S. Application Data

[60] Provisional application No. 60/044,731, Apr. 21, 1997.
[51] Int. Cl.$^6$ .............................. F16B 39/12; F16B 39/24
[52] U.S. Cl. ........................ 411/149; 411/238; 411/354; 411/433
[58] Field of Search ..................... 411/149, 150, 411/237, 238, 264, 354, 383, 433

[56] References Cited

U.S. PATENT DOCUMENTS

| | | | |
|---|---|---|---|
| 1,627,745 | 5/1927 | Madden | 411/238 |
| 2,244,400 | 6/1941 | Miller | 411/238 |
| 2,301,634 | 11/1942 | Nicholay | 411/238 |
| 4,808,050 | 2/1989 | Landt | |
| 5,104,141 | 4/1992 | Grove et al. | 411/354 X |
| 5,474,409 | 12/1995 | Terry | 411/149 X |
| 5,533,849 | 7/1996 | Burdick | |
| 5,692,863 | 12/1997 | Louw | |
| 5,700,121 | 12/1997 | Minola | |

*Primary Examiner*—Neill Wilson
*Attorney, Agent, or Firm*—Hovey, Williams, Timmons & Collins

[57] ABSTRACT

A locking fastener (14) includes a threaded bolt (16) and a nut assembly (26) comprising a torque nut (28) and a lock nut (30). The lock nut (30) is threadably received on the bolt (16) and is shiftable to a locked condition in which the lock nut thread axis (76) is misaligned relative to the bolt thread axis (24) so as to restrict rotation of the lock nut (30) relative to the bolt (16). Such misalignment is achieved by cam surfaces (48,72) defined on the torque nut (28) and the lock nut (30), wherein the cam surfaces (48,72) cooperatively shift the lock nut (30) to the locked condition when the nuts (28,30) are moved relative to one another.

43 Claims, 14 Drawing Sheets

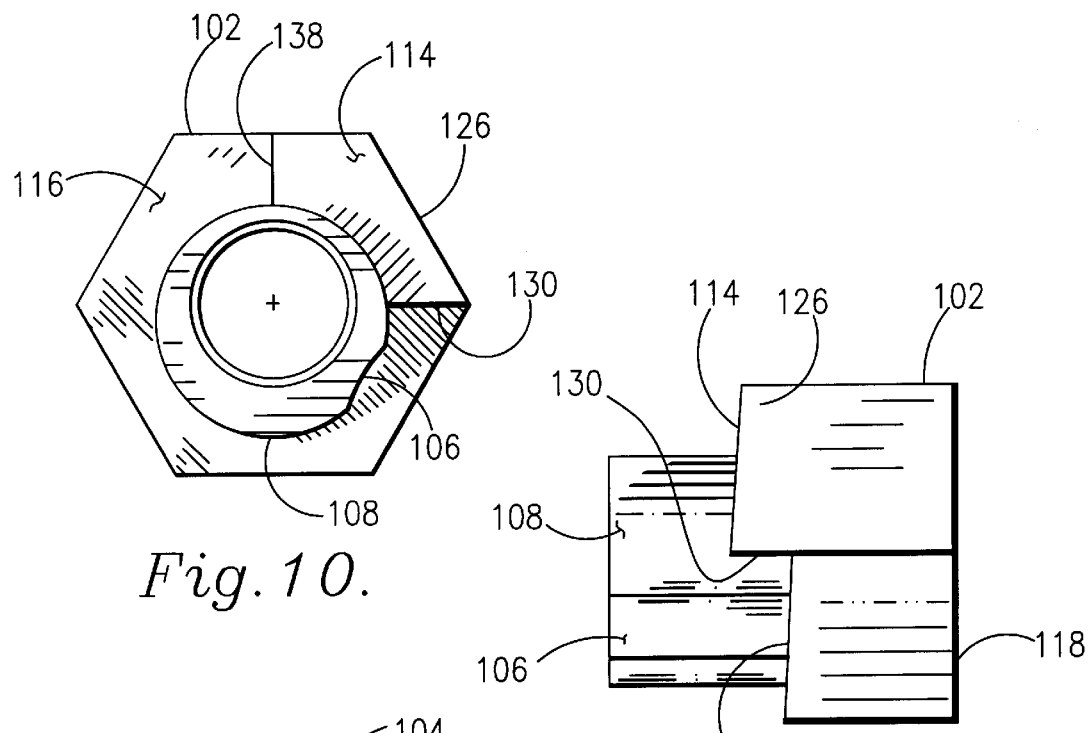
Fig.10.
Fig.11.
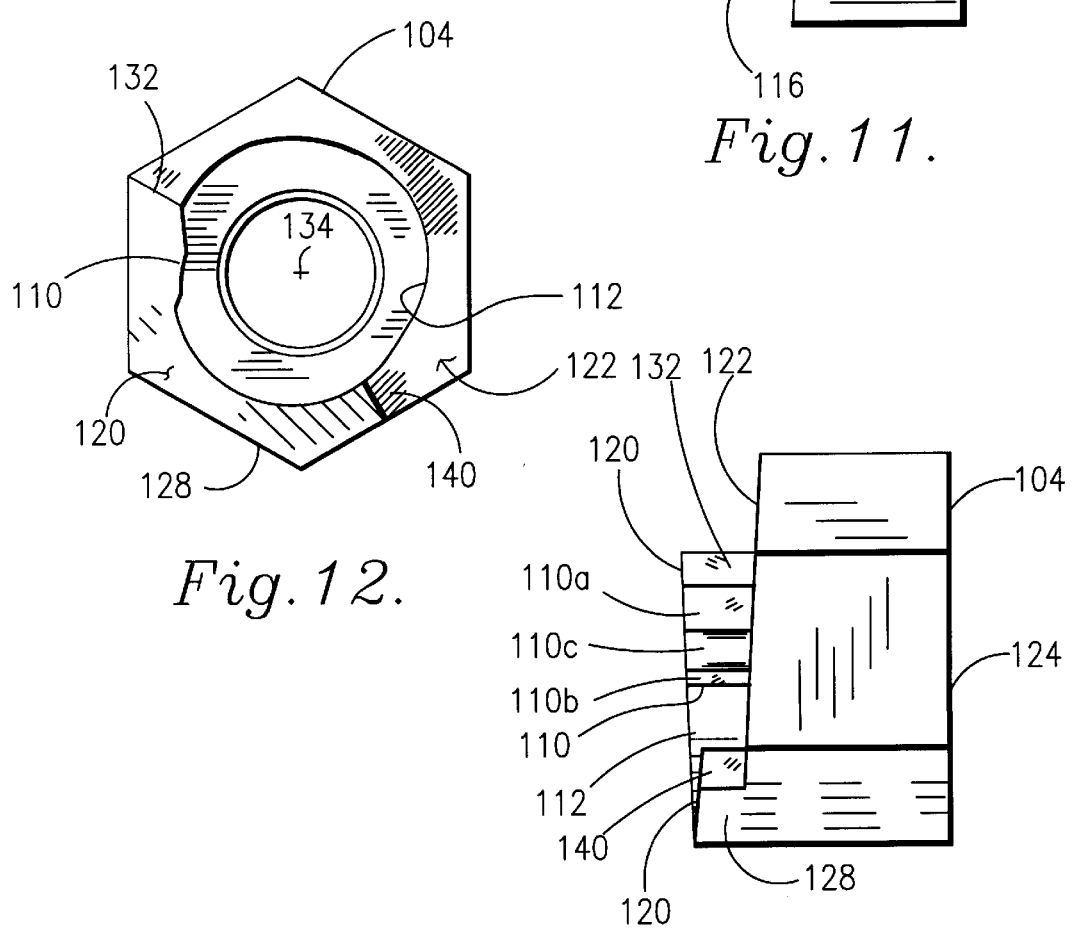
Fig.12.
Fig.13.

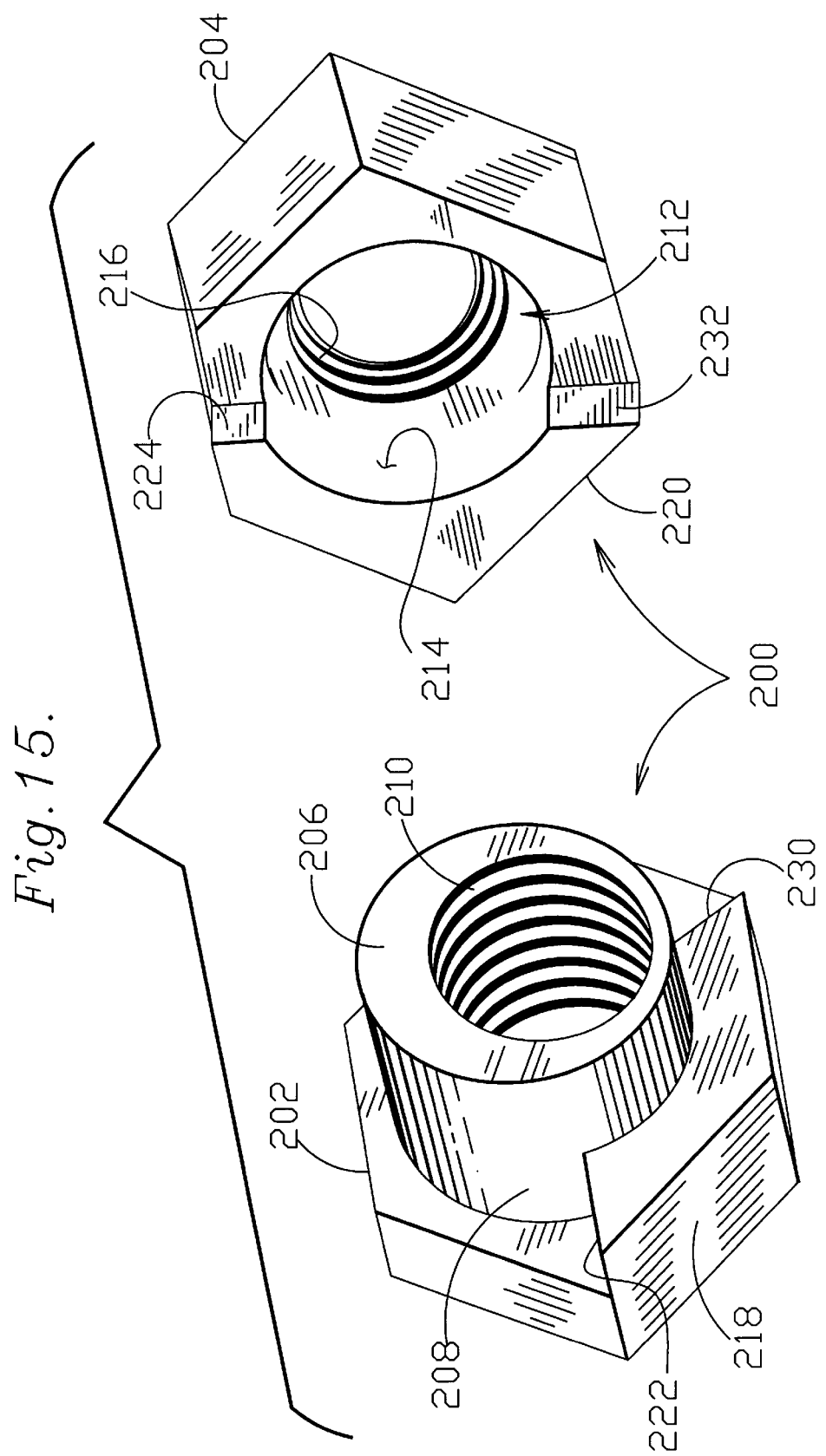

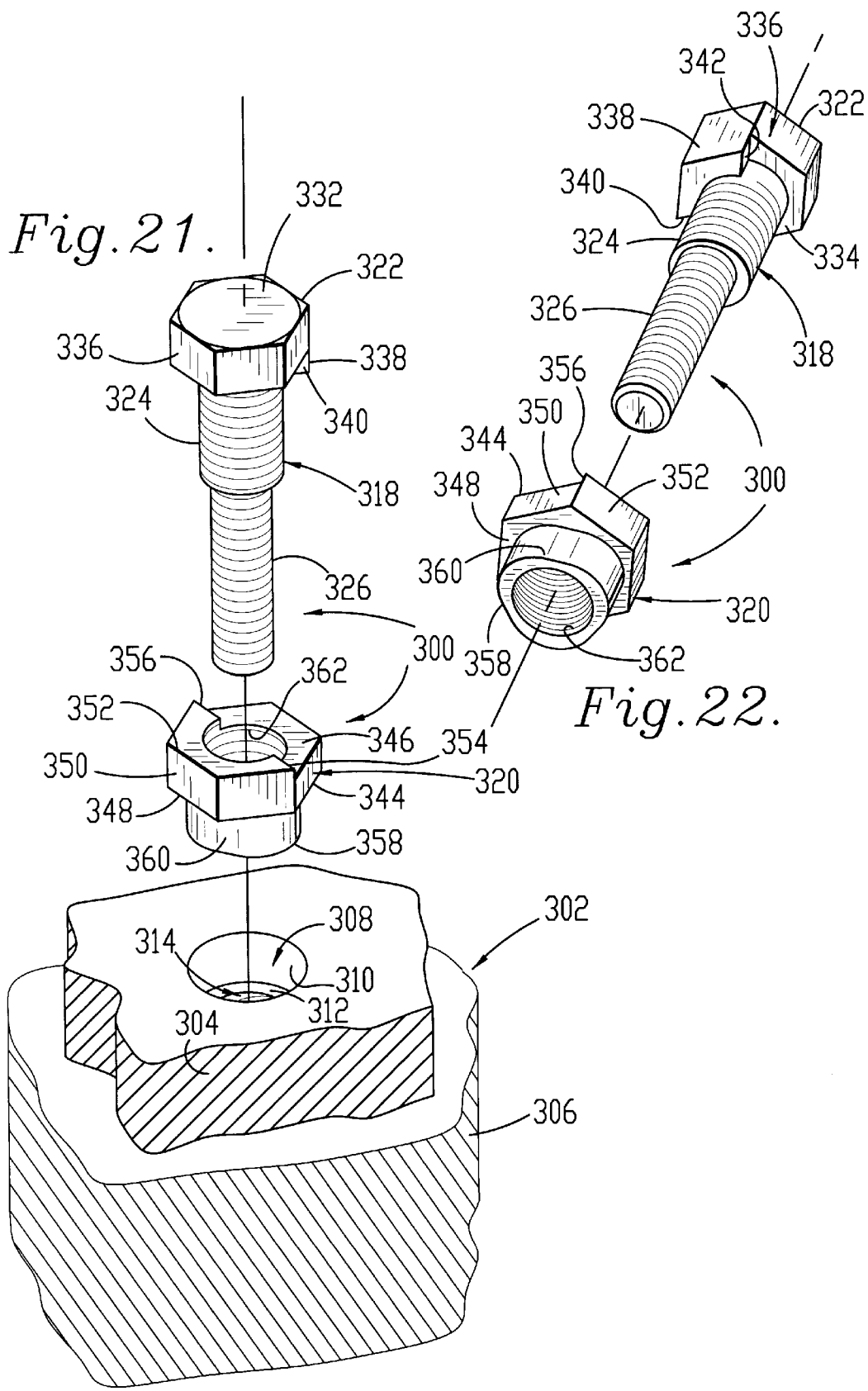

LOCKING FASTENER

RELATED APPLICATION

This Application claims the benefit from the Provisional Patent Application Ser. No. 60/044,731, filed Apr. 21, 1997, and entitled "Self Locking Fastener", the teachings of which are incorporated herein by reference.

BACKGROUND OF THE INVENTION

1. Field of the Invention

The present invention relates generally to mechanical fasteners and, more particularly, to an improved locking fastener that is relatively insusceptible to inadvertent unfastening caused by vibrational or shock loading.

2. Discussion of Prior Art

A common problem with conventional mechanical fasteners is their susceptibility to inadvertent unlocking or unfastening as a result of vibrational or shock loading experienced by the fastener. It is known to provide fasteners with some means for enhancing or supplementing the pretension load traditionally generated by tightening the nut and bolt relative to one another. However, virtually all known attempts to develop a locking fastener that securely locks in a fastened condition are deficient for one reason or another. For example, several of the traditional locking fasteners are simply inadequate in restricting inadvertent unfastening of the fastener as a result of vibrational or shock loading. Additionally, a number of traditional locking fasteners are impractical because they are difficult to use or have complex and expensive constructions.

Furthermore, many of the known locking fasteners operate in such a manner that the fastener is limited to only one or, at the very most, relatively few applications. That is to say, traditional locking fasteners are commonly not reusable. This is often attributable to the fact that a portion of the fastener is stressed beyond its yield strength when used. One example of such nonelastic deformation is a locking nut having a plastic insert or coating covering the threads, such that the threads of the bolt "cut" into the plastic material. Although the insert or coating enhances the gripping force between the threads of the nut and the bolt, this type of fastener can only be used once. Another example of such a deficiency is a fastener having oversized bolt threads or undersized nut threads which enhance the locking power of the fastener yet significantly and quickly wear the threads of the bolt and nut.

OBJECTS AND SUMMARY OF THE INVENTION

Responsive to these and other problems, an important object of the present invention is to provide a fastener that may be securely locked in a fastened condition so as to reduce the risk of inadvertent unfastening. Another important object of the present invention is to provide a fastener having a relatively simple and inexpensive construction that is easy to use. In addition, an important object of the present invention is to provide a fastener that may be reused virtually without limitation.

In accordance with these and other objects evident from the following description of the preferred embodiments of the invention, the fastener includes a nut assembly for use with an externally threaded bolt. The nut assembly includes a torque nut and a lock nut. The lock nut is threadably received on the bolt and is shiftable to a locked condition in which the thread axis of the lock nut is misaligned relative to the bolt thread axis so as to prevent rotation of the lock nut relative to the bolt. Such misalignment is achieved by cooperating cam surfaces defined on the torque nut and the lock nut. The gripping stress generated generally between the cam surfaces is sufficient to resist inadvertent shifting of the lock nut from the misaligned condition. It has been determined that this construction is relatively durable and allows the fastener to be used more than once.

If desired, the nuts may be configured to interengage one another, when the lock nut is spaced slightly out of the locked condition, in such a manner that a relatively greater stress level is generated by the nuts generally at the cam surfaces than when the lock nut is in the locked condition. This increased stress level serves to restrict rotation of the lock nut from the locked condition to the unlocked condition, as the lock nut will have a natural tendency to remain in a condition corresponding to the lowest possible stress level. Additionally, the nuts may be provided with stops that serve to restrict rotation of the lock nut in an opposite direction beyond the locked condition. Accordingly, inadvertent movement of the lock nut from the locked condition is further restricted by the stops and the increased stress level.

It is also within the ambit of the present invention to provide a fastener for attachment to a structure having an internally threaded hole extending inwardly from a substantially coaxial counterbore. The fastener includes a bolt having a head, an externally threaded shank, and a neck between the head and the shank. The fastener further includes a locking collar associated with the neck of the bolt for movement between a locked position in which the locking collar is wedged between the neck and the wall of the counterbore for producing a wedging stress that restricts rotation of the bolt, and an unlocked position in which the locking collar remains substantially disengaged from the wall of the counterbore so that the bolt may be freely rotated into and out of the hole. Similar to the nut assembly, the locking collar may be configured to interengage the neck of the bolt and the wall of the counterbore in such a manner that a relatively higher stress level is generated than when the locking collar is in its locked position. This relatively higher stress level similarly serves to restrict inadvertent movement of the locking collar from the locked condition to the unlocked condition. Additionally, the locking collar and bolt head may similarly include stops which cooperatively restrict movement of the locking collar in an opposite direction beyond the locked position.

Other aspects and advantages of the present invention will be apparent from the following detailed description of the preferred embodiments and the accompanying drawing figures.

BRIEF DESCRIPTION OF THE DRAWING FIGURES

A preferred embodiment of the invention is described in detail below with reference to the attached drawing figures, wherein:

FIG. 10 is a relatively reduced end elevational view of the torque nut shown in FIG. 9;

FIG. 11 is a relatively reduced side elevational view of the torque nut shown in FIG. 9;

FIG. 12 is a relatively reduced end elevational view of the lock nut shown in FIG. 9;

FIG. 13 is a relatively reduced side elevational view of the lock nut shown in FIG. 9;

FIG. 15 is a perspective view of a nut assembly, including a torque nut and a lock nut, according to a third embodiment of the present invention;

FIG. 21 is an exploded, perspective view of a fastener, according to a fourth embodiment of present invention, and the structure to which the fastener attaches;

FIG. 22 is an exploded, perspective view of only the fastener shown in FIG. 21;

DETAILED DESCRIPTION OF THE PREFERRED EMBODIMENTS

Figure 1:
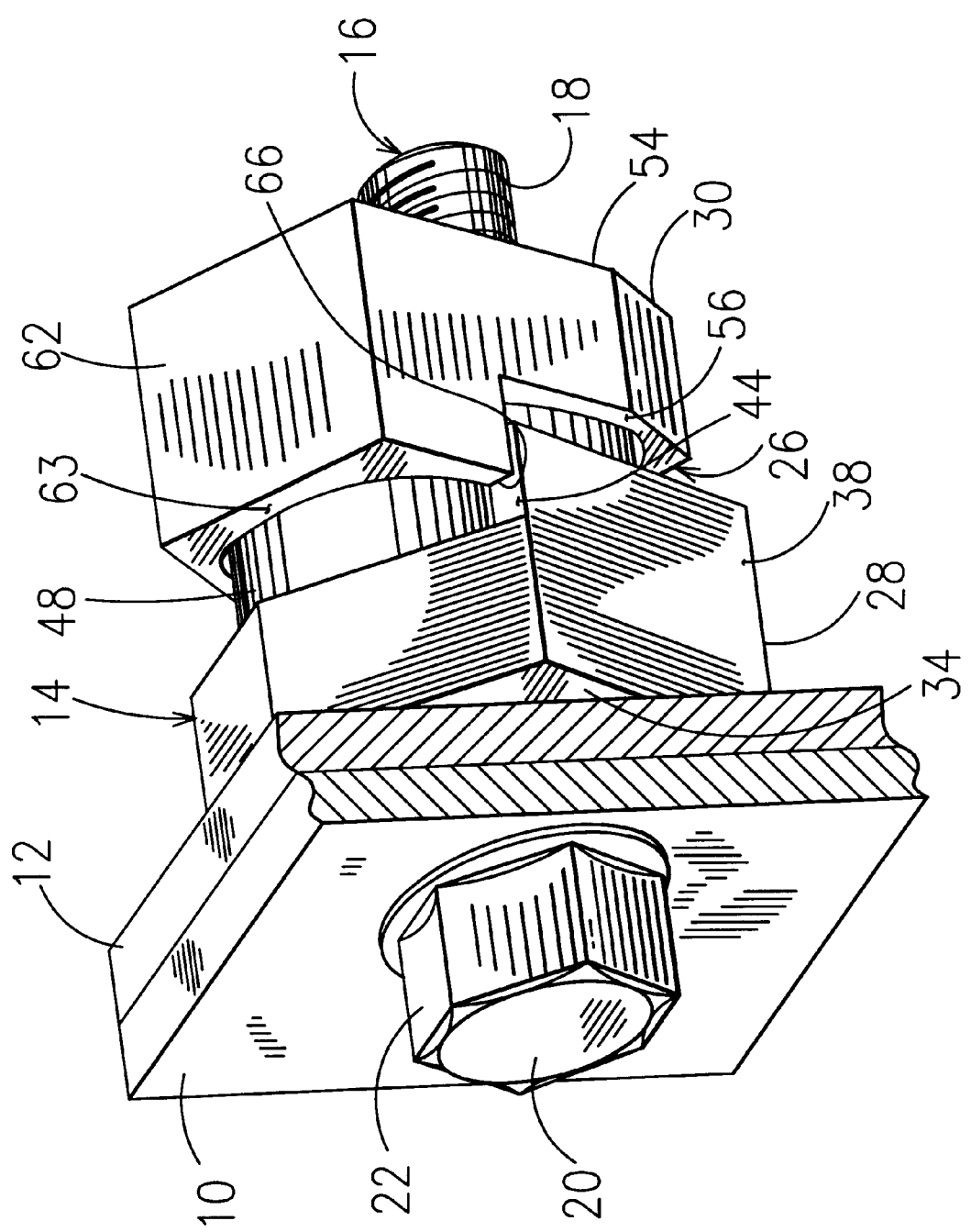
FIG. 1 is a fragmentary, perspective view of a locking fastener constructed in accordance with the principles of the present invention, with the fastener serving to fasten a pair of plates together.

Turning initially to FIG. 1, a pair of flat plates 10,12 are fastened to one another by a locking fastener 14 constructed in accordance with the principles of the present invention. It shall be noted that the plates 10,12 are depicted for illustrative purposes only and therefore should not be used in any manner to limit the scope of the present invention. In other words, the locking fastener 14 may be attached to virtually any structure.

Figure 8:
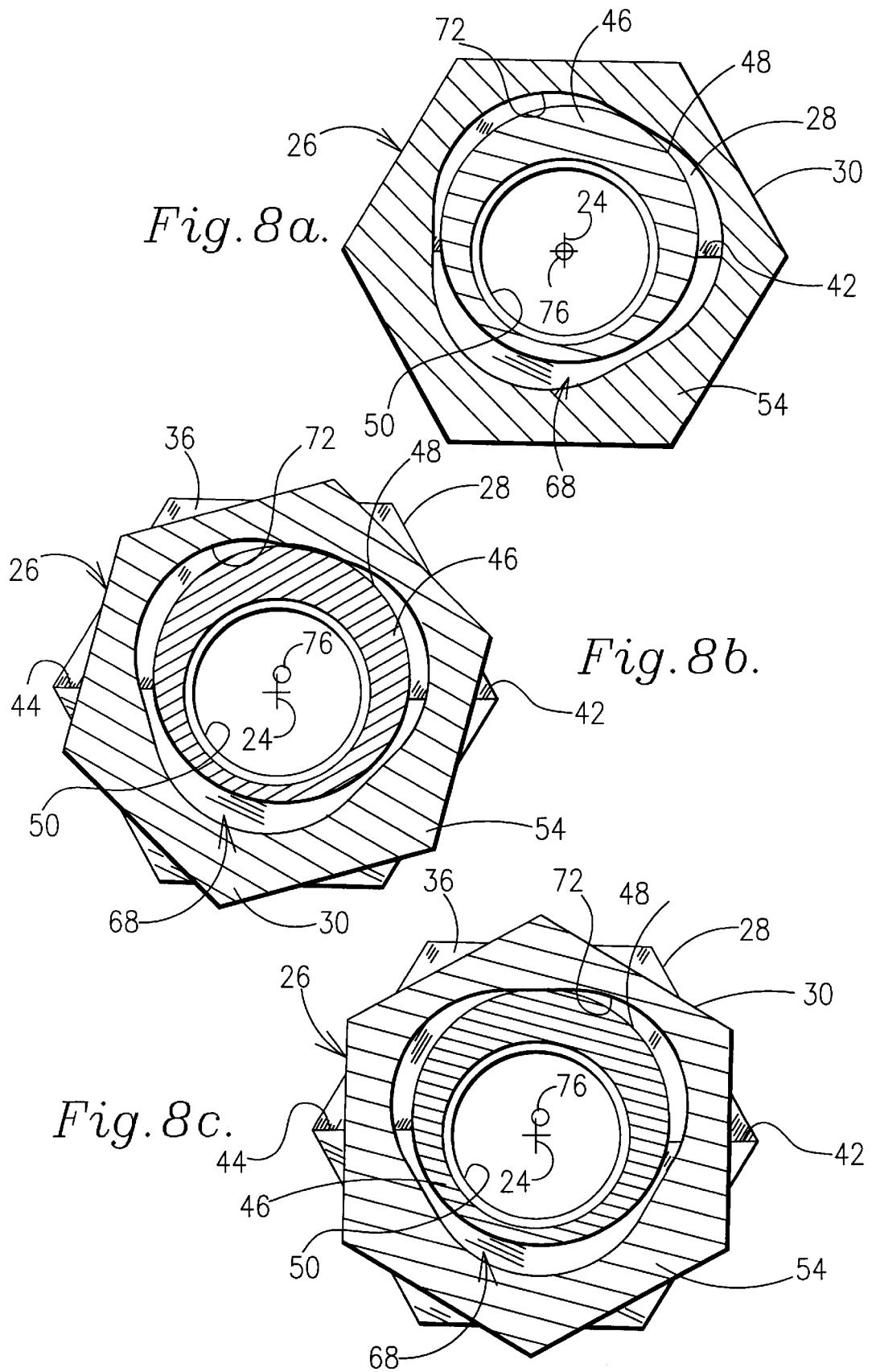
FIG. 8a is cross-sectional view of the fastener taken along line 8—8 in FIG. 2, particularly illustrating the lock nut in the unlocked condition.
FIG. 8b is a cross-sectional view of the fastener similar to FIG. 8a, but illustrating the lock nut between the locked and unlocked conditions in a position corresponding to the greatest stress level generated between the nuts.
FIG. 8c is a cross-sectional view of the fastener similar to FIG. 8a, but illustrating the lock nut in the locked condition with its thread axis misaligned relative to the bolt thread axis.

With the foregoing caveat in mind, the illustrated fastener 14 comprises a standard bolt 16 including a cylindrical, externally threaded shank 18 and a head 20 at one end of the shank 18. The head 20 has a six-sided exterior surface 22 so as to conform to traditional sockets and wrenches. The thread pitch and various other constructional details of the bolt 16 are not critical to the principles of the present invention and consequently may be varied as desired. However, it is noted that the bolt presents a thread axis that corresponds to the longitudinal centerline of the shank 18 and is represented by a cross in FIGS. 8a–8c. As shown in FIGS. 8a–8c, the thread axis (i.e., the cross) will be referenced by the numeral 24 hereinbelow.

The fastener 14 further comprises a nut assembly 26 received on the bolt 16. As will be further described below, the illustrated nut assembly 26 cooperates with the bolt 16 to pretension the fastener 14 and also serves to securely lock the fastener in the fastened condition. The nut assembly 26 comprises a torque nut 28 and a lock nut 30 that cooperatively provide the functions of the assembly 26.

Figure 3:
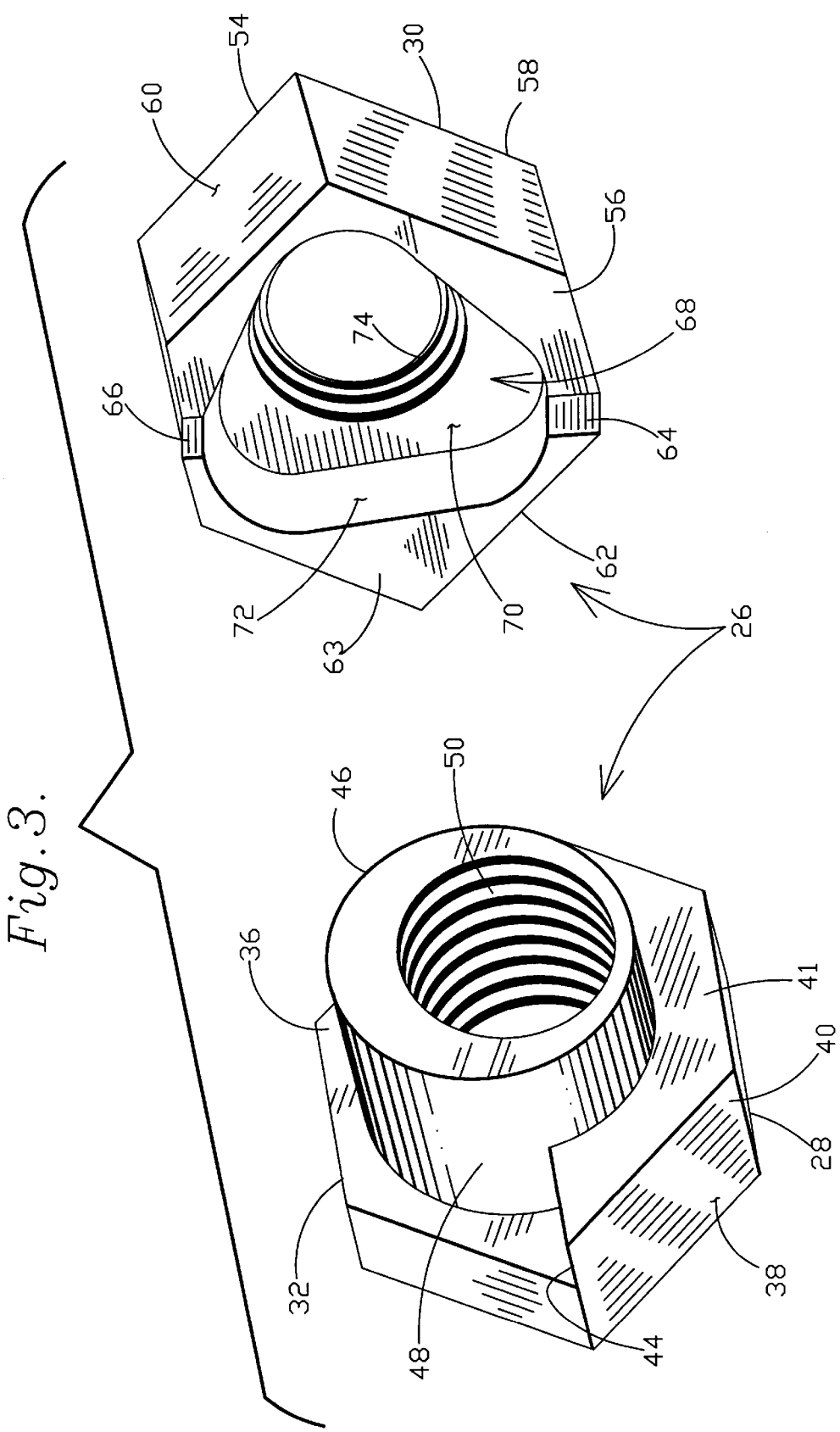
FIG. 3 is an enlarged perspective view of the nut assembly, including the torque and the lock nut, shown in FIG. 1.
Figure 4:
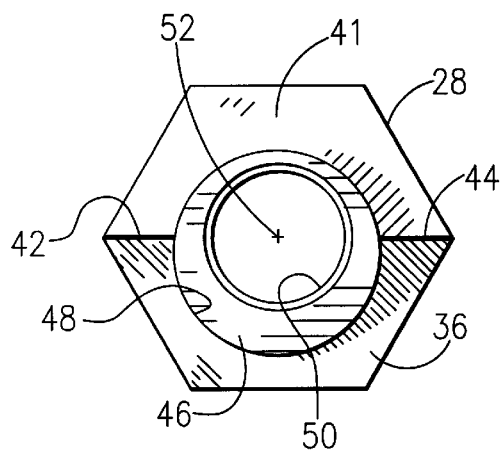
FIG. 4 is a retatively reduced end elevational view of the torque nut.
Figure 5:
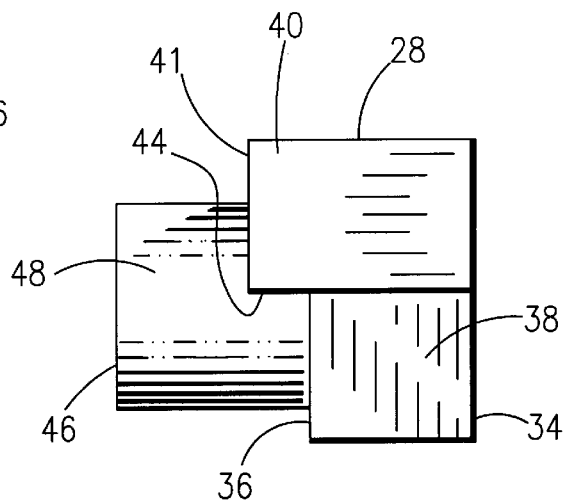
FIG. 5 is a relatively reduced side elevational view of the torque nut.

The torque nut 28 includes a polygonal body 32 having opposite, flat faces 34 and 36 (see FIGS. 1 and 3) and a six-sided exterior surface 38 extending between the faces 34 and 36. As perhaps best shown in FIGS. 3 and 5, a shoulder 40 projects from the face 36 along three sides of the body 32. For purposes which will subsequently be described, the shoulder 40 has a face 41 spaced from the face 36 of the body 32 to define an unlocking stop 42 (see FIG. 4) and a locking stop 44 (see FIGS. 1, 3 and 4) therebetween. A cylindrical projection 46 also extends from the face 36 of the body 32, with the projection 46 presenting an outer cylindrically-shaped cam surface 48. It will be noted that the length of the cam surface 48 is relatively shorter along the shoulder 40 (i.e., between the stops 42 and 44) than along the remaining circumference of the projection 46. The torque nut 28 further includes an internally threaded opening 50 extending through the body 32 and the cylindrical projection 46. As perhaps best shown in FIG. 4, the threaded opening 50 presents a center thread axis represented by the cross 52 which is substantially coaxial with the geometrical center of the body 32. However, the geometrical center of the cylindrical projection 46 is offset relative to the torque nut thread axis 52 such that the cylindrically-shaped cam surface 48 is eccentric with respect to the opening 50.

Figure 6:
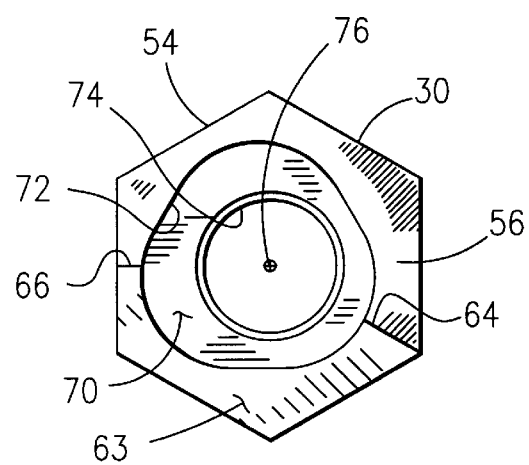
FIG. 6 is a relatively reduced end elevational view of the lock nut.
Figure 7:
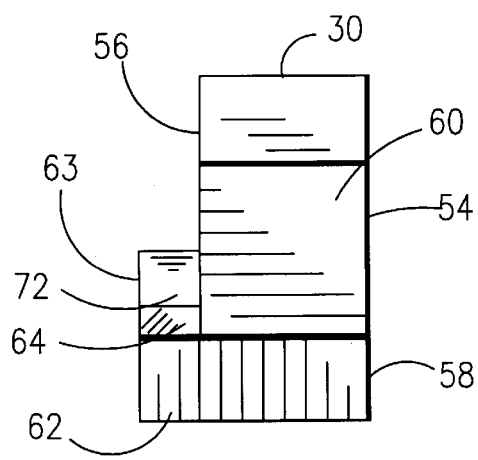
FIG. 7 is a relatively reduced side elevational view of the lock nut.

The lock nut 30 similarly includes a polygonal body 54 having opposite, flat faces 56 and 58 (see FIGS. 3 and 7) and a six-sided exterior surface 60 extending between the faces 56 and 58. It will be noted that the exterior surface 60 of the lock nut 30 has generally the same shape and dimensions as the exterior surface 38 of the torque nut 28. A shoulder 62 similarly projects from the face 56 along two complete sides and part of another side of the body 54. As perhaps best shown in FIGS. 3 and 6, the shoulder 62 has a face 63 spaced from the face 56 of the body 54, such that the faces 63 and 56 cooperatively define an unlocking stop 64 configured to abuttingly interengage the unlocking stop 42 of the torque nut 28, and a locking stop 66 configured to abuttingly interengage the locking stop 44 of the torque nut 28. Accordingly, relative rotational movement of the nuts 28 and 30 is limited by interengagement of the unlocking stops 42 and 64 and the locking stops 44 and 66.

A generally triangular-shaped counterbore 68 is defined by an endmost floor 70 and a wall 72 projecting from the floor 70. It will be noted that the wall 72 is defined between the floor 70 and the face 56 of the body 54 along part of the counterbore 68, and between the floor 70 and the face 63 along the part of the counterbore extending along the shoulder 62. The lock nut 30 further includes an internally threaded opening 74 extending between the floor 70 of the counterbore 68 and the face 58 of the body 54. As perhaps best shown in FIG. 6, the opening 74 presents a center thread axis represented by the circle 76 that is generally aligned with the geometrical center of the body 54. However, the counterbore 68 is not centered relative to the geometry of the body 54. The counterbore 68 is configured to receive the eccentric projection 46 of the torque nut 28. Moreover, the wall 72 of the counterbore 68 serves as a cam surface that cooperates with the cam surface 48 of the torque nut 28 to shift the lock nut 30 to a locked condition for securely locking the fastener 14 in a fastened condition, when the nuts 28 and 30 are rotated relative to one another.

Figure 2:
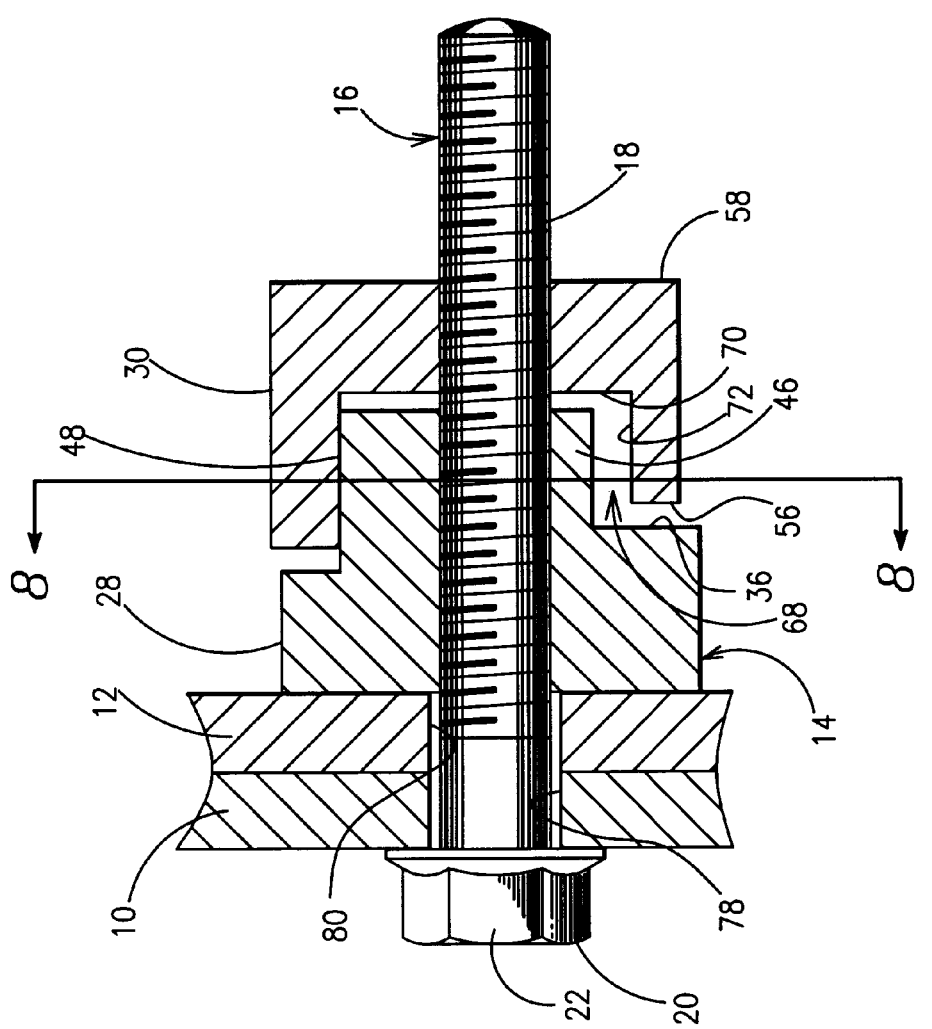
FIG. 2 is a cross-sectional view of the fastener illustrated in FIG. 1, particularly illustrating the lock nut in the locked condition.

In use, the fastener 14 is installed by first inserting the bolt 16 through aligned openings 78 and 80 defined in the plates 10 and 12, respectively (see FIG. 2). The internally threaded openings 50 and 74 of the nuts 28 and 30 are configured to threadably engage the bolt shank 18, and accordingly, the nut assembly 26 is threaded onto the bolt 16. The nuts 28 and 30 are first assembled, with the eccentric projection 46 of the torque nut 28 being inserted into the counterbore 68 of the lock nut 30. The nuts 28 and 30 are arranged relative to one another so that the unlocking stops 42 and 64 are interengaged and the eccentric projection 46 is disposed within the counterbore 68 as shown in FIG. 8a. The nuts 28 and 30 are then threaded onto the portion of the bolt shank 18 projecting beyond the plate 12, with the face 34 of the torque nut 28 being directed toward the plate 12. It will be appreciated that the thread axes 52 and 76 of the nuts 28 and 30 are substantially aligned with the bolt thread axis 24 as the nut assembly 26 is threaded onto the bolt 16. As with conventional threaded fasteners, such alignment is necessary for allowing relative rotation between the threaded components. Furthermore, because of the abutting interengagement of the unlocking stops 42 and 64, torque may be exerted only on the lock nut 30 for simultaneously screwing both nuts 28 and 30 along the bolt shank 18. That is to say, a torsional load exerted on the lock nut 30 is transferred to the torque nut 28 via the interengagement of the unlocking stops 42 and 64.

Once the face 34 of the torque nut 28 engages the plate 12, the fastener 14 is preloaded by continued torsional application on the nut assembly 26 in the usual manner. However, it is preferred that such continued torsional loading is applied directly on the torque nut 28, and consequently, the wrench (not shown) is moved from the lock nut 30 to the torque nut 28 and a second wrench (not shown) is placed on the head 20 of the bolt 16. As is traditionally done, the wrenches are used to apply torsional loads on the bolt 16 and torque nut 28 in their respective tightening directions to preload the fastener 14. To this extent, the fastener 14 operates in generally the same manner as a standard nut and bolt assembly. The arrangement of the lock nut 30 relative to the torque nut 28 at this stage of installation will be referred to as the unlocked condition. The lock nut thread axis 76 is substantially aligned with the bolt thread axis 24 when the lock nut 30 is in the unlocked condition. Although not shown, it will be appreciated that the torque nut thread axis is also aligned with the bolt thread axis 24 and, in fact, remains substantially aligned with the bolt thread axis even when the lock nut 30 is shifted to its locked condition. With the nut thread axes being substantially aligned with the bolt thread axis, the nut assembly 26 may be removed from the bolt 16 at this stage of installation simply by exerting torque against the torque nut 28 in a loosening direction. The torsional loading against the torque nut 28 will be transferred to the lock nut 30 via the unlocking stops 42 and 64 so that the entire nut assembly 26 unscrews relative to the bolt 16.

However, if it is desired to securely lock the nut assembly 26 in the fastened condition, the lock nut 30 is rotated relative to the torque nut 28 in a loosening direction (i.e., a counter-clockwise direction when viewing FIG. 8a) approximately thirty degrees to a locked condition (shown in FIG. 8c). The torque nut 28 remains stationary during such rotation of the lock nut 30. It will be noted from FIG. 8a that the cam surfaces 48 and 72 contact one another when the lock nut 30 is in its unlocked condition, however, such contact is negligible and does not restrict relative rotation of the nuts 28 and 30. As the lock nut 30 rotates toward the locked condition, the interengagement of the nuts 28 and 30 along the cam surfaces 48 and 72 progressively increases until a maximum interference condition is reached (corresponding to the position of the lock nut 30 shown in FIG. 8b), wherein a jamming stress is generated by the nuts 28 and 30. Particularly, the nuts 28 and 30 are configured to interfere with one another along the cam surfaces 48 and 72 such that the nuts substantially elastically deform (i.e., there may be some insignificant plastic deformation) generally at the cam surfaces. Such elastic deformation is greatest at the maximum interference condition of the lock nut 28. This deformation generates significant compressive stresses within the nuts 28 and 30 that cooperate with the forces generated by the frictional interengagement of the cam surfaces 48 and 72 to produce a jamming stress level corresponding to the maximum interference condition of the lock nut 28. As shown in FIG. 8b, the cam surface 72 of the lock nut 30 engages the cam surface 48 of the torque nut 28 at generally the thickest portion of the eccentric projection 46. Additionally, the lock nut thread axis 76 is misaligned relative to the bolt thread axis 24.

Further rotation of the lock nut 28 in the counter-clockwise direction toward its locked condition reduces the stress level generated by the nuts 28 and 30. Particularly, the cam surface 72 of the lock nut 28 slides along the cam surface 48 of the torque nut 28 to a relatively thinner portion of the eccentric projection 46 so as to reduce the elastic deformation of the nuts 28 and 30 and the frictional interengagement therebetween. Consequently, a gripping stress is generated by the nuts 28 and 30 that is relatively less than the jamming stress produced at the maximum interference condition of the lock nut 30. The lock nut 30 therefore has a natural tendency to remain in the locked condition; that is to say, the lock nut 30 will have a natural tendency to remain in a lower stress condition (i.e., the locked condition) as opposed to a higher stress condition (i.e., the maximum interference condition). It will be noted, however, that the gripping stress generated by the nuts 28 and 30 when the lock nut is in its locked condition does restrict movement of the lock nut 30 relative to the torque nut 28. In addition, the locking stops 44 and 66 of the nuts 28 and 30 are abuttingly interengaged to prevent movement of the lock nut in a counter-clockwise direction beyond the locked condition. Accordingly, the lock nut is "nested" between barriers (i.e., the interengagement of the locking stops 44,66 and the relatively higher stress level corresponding to the maximum interference condition of the lock nut) which restrict movement of the lock nut from the locked condition.

Moreover, the interengagement of the cam surfaces 48 and 72 serve to shift the lock nut thread axis 76 until it is sufficiently misaligned relative to the bolt thread axis 24 to restrict rotation of the lock nut 30 relative to the bolt 16. The symbol representing the lock nut thread axis 76 is shown spaced above and slightly to the right of the symbol representing the bolt thread axis (see FIG. 8c). However, this depiction should not be interpreted to mean that the axes are parallel and offset from one another. These symbols have been added to the drawings for illustrative purposes only. In fact, the relationship of the lock nut and bolt thread axes may better be described as canted or skewed and likely intersect one another or are coaxial along portions thereof. Nonetheless, there is sufficient misalignment of the axes to prevent relative rotation of the lock nut 28 and the bolt 16. It will be appreciated that such misalignment is afforded, at least in part, by the tolerances (i.e., spacing) between the threads of the lock nut opening 74 and the bolt shank 18. It has also been determined that such misalignment of the axes 24 and 76 causes the lock nut 28 to press against one side of the bolt shank 18 to generate relatively substantial bending moments on the bolt shank 18.

The foregoing description should sufficiently set forth the locking capability of the fastener 14 for preventing inadvertent unfastening caused by vibrational or shock loading. Thus, it is sufficient to explain that rotation of the torque nut 28 in a loosening direction (i.e., in a counter-clockwise direction when viewing FIGS. 8a–8c) is restricted by the pretensioning load produced by torquing the nut 28 against the plate 12. In addition, such loosening of the torque nut 28 would require rotation relative to the lock nut 30 because the latter is restricted from rotating relative to the bolt 16, as noted above. Accordingly, the vibrational or shock loading experienced by the torque nut 28 must initially be sufficient to overcome the gripping stress generated by the nuts when the lock nut 30 is in the locked condition. Moreover, the vibrational or shock loading must also be sufficient to overcome the relatively higher jamming stress generated by the nuts when the locknut 30 is in the misaligned condition. The jamming stress must also be overcome by the vibrational or shock loading because the cam surface 48 defined along the relatively thickest part of the eccentric projection 46 must slide along the cam surface 72 of the lock nut 30. That is to say, the nut assembly 26 cannot be inadvertently loosened when the lock nut 30 is in its locked condition, unless the vibrational or shock loading is extraordinarily sufficient to rotate the torque nut 28 relative to the lock nut 30 and overcome the gripping and jamming stresses. The nut assembly 26 is designed to generate sufficient residual stresses (e.g., the gripping and jamming stresses generated by the nuts 28 and 30, the pretension load of the fastener, the bending moment exerted by the lock nut 28 on the bolt shank 18, etc.) that render the fastener 14 relatively insusceptible to inadvertent unfastening caused by ordinary vibrational and shock loads.

Preferably, the fastener 14 is removed by first rotating the lock nut 30 in a clockwise direction from its locked condition. Once the lock nut 30 reaches the unlocked condition, the wrench (not shown) is moved to the torque nut 28 and a second wrench is placed on the bolt head 20 to apply torsional loads which relieve the pretension of the fastener; that is to say, the torque nut 28 is rotated in a loosening direction (i.e., a counter-clockwise direction when viewing FIGS. 8a–8c) relative to the bolt 16. As noted above, the lock nut 30 rotates with the torque nut 28 because of the interengagement of the unlocking stops 42 and 64. Because the nuts 28 and 30 are designed to deform substantially elastically at the cam surfaces 48 and 72, the nut assembly 26 may be reused virtually without limitation. Furthermore, any wear produced by such elastic deformation occurs solely or, at lease primarily, at the cam surfaces 48 and 72 and not along the more fragile threads of the components. Preferably, the torque nut 28 and lock nut 30 are formed of the same material (e.g., metal) so that they elastically deform substantially equally, although it is entirely possible that such deformation is not equal as a result of stress concentrations, imperfections in the material, etc. Again, there may be some plastic deformation on a "micro" scale, although this is relatively insignificant and is unlikely to reduce the life of the components.

FIGS. 9–14c illustrate a second embodiment of the present invention including a nut assembly 100 having a torque nut 102 and a lock nut 104 similar to the first embodiment. However, it may be said that this embodiment is an improvement of the first embodiment in the sense that the former virtually eliminates the risk of inadvertent loosening of the torque nut 102. In other words, with a fastener including the nut assembly 100, the only way to unfasten the fastener is to rotate the lock nut 104 relative to the torque nut 102 out of the locked condition and beyond the maximum interference condition, as will subsequently be described. This advantage is provided by several features not included in or different from the first embodiment.

Figure 14A:
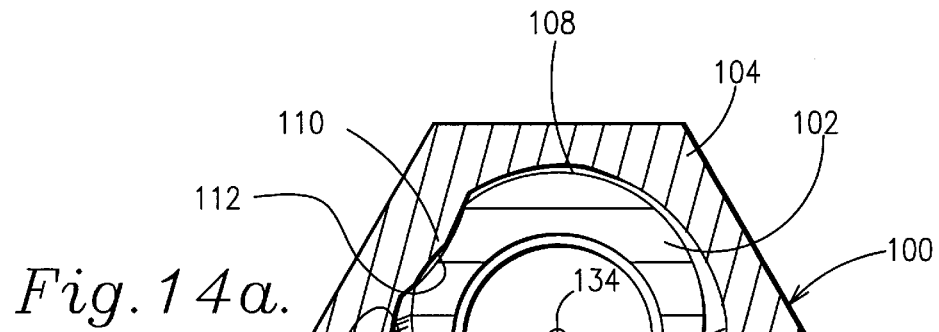
FIG. 14a is a cross-sectional view of a fastener including the nut assembly shown in FIG. 9, particularly illustrating the lock nut in the unlocked condition, with a detent defined along the cam surface of the lock nut received in a recess defined along the cam surface of the torque nut.
Figure 14B:
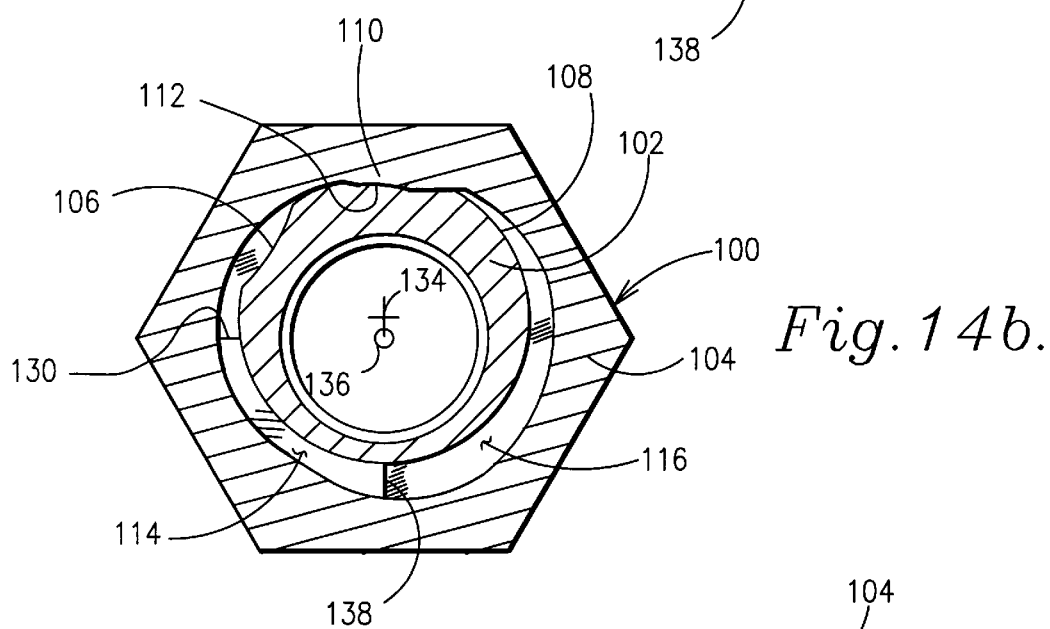
FIG. 14b is a cross-sectional view of the fastener similar to FIG. 14a, but illustrating the lock nut between the locked and unlocked conditions in a position corresponding to the greatest stress level generated between the nuts.
Figure 14C:
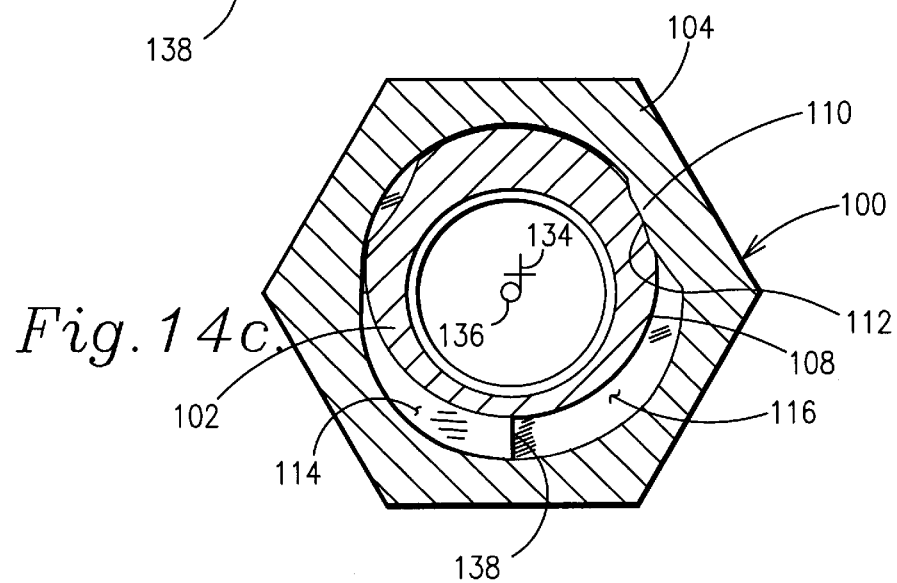
FIG. 14c is a cross-sectional view of the fastener similar to FIG. 14a, but illustrating the lock nut in the locked condition with its thread axis misaligned relative to the bolt thread axis.
Figure 16:
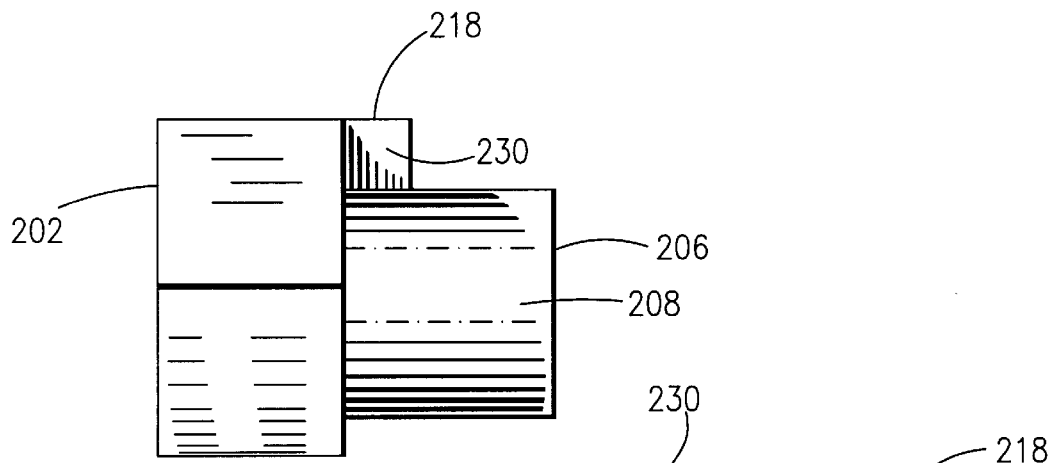
FIG. 16 is a relatively reduced side elevational view of the torque nut shown in FIG. 15.

First, a recess 106 is defined along the cylindrically-shaped cam surface 108 of the torque nut 102 for receiving a detent 110 defined along the cam surface 112 of the lock nut 104. The recess 106 has a generally arcuate shape, while the detent 110 is segmented to include a pair of spaced flat surfaces 110a, 110b and an arcuate surface 110c extending therebetween (see FIG. 9). As shown in FIG. 14a, the detent 110 is received within the recess 106 when the lock nut 104 is in the unlocked condition, but shifts relative thereto as the lock nut 104 rotates to the locked condition. The registration of the detent 110 within the recess 106 serves to transfer torque applied in either direction on the lock nut 104 to the torque nut 102, so that rotation of the lock nut 104 effects rotation of the torque nut 102 when the nut assembly 100 is freely screwing along the bolt (not shown). It will be noted, however, that this interconnection of the nuts 102 and 104 should not be used in preloading the fastener. Similar to the first embodiment, the torsional load for pretensioning the fastener should be applied directly to the torque nut 102. It is also noted that the cam surface 112 of the lock nut 104 is not triangular in shape, but rather has a non-cylindrical, somewhat egg shape (see FIGS. 12 and 14a–14c).

Additionally, the shoulder face 114 and the adjacent body face 116 of the torque nut 102 are sloped at generally the same angle and same direction relative to the opposite body face 118 (see FIG. 11). The shoulder face 120 and adjacent body face 122 of the lock nut 104 are likewise sloped at generally the same angle and direction relative to the opposite body face 124. Although not shown in detail, it will be appreciated that the shoulder face 114 of the torque nut 102 and the body face 122 of the lock nut 104 are configured to progressively interengage as the lock nut 104 is rotated relative to the torque nut 102 toward the locked condition so as to produce a wedging stress that restricts relative rotation of the nuts 102 and 104. If desired, the nuts 102 and 104 may be designed to elastically deform generally at the faces 114 and 122 when the lock nut 104 is in the locked condition, whereby the wedging stress comprises residual compressive stresses in the nuts 102 and 104 along with any frictional restraints against relative rotation of the nuts 102 and 104. The body face 116 of the torque nut 102 and the shoulder face 120 of the lock nut 104 are similarly designed to generate a wedging stress for restricting relative rotation of the nuts 102 and 104 when the lock nut 104 is in the locked condition. Such interengagement of the shoulder faces 114 and 120 and the body faces 116 and 122 serve to enhance the locking power of the fastener.

Contrary to the first embodiment, the shoulders 126 and 128 of the torque nut 102 and lock nut 104 are arranged so that the lock nut 104 is rotated in a tightening direction (i.e., a clockwise direction when viewing FIGS. 14a–14c) from the unlocked condition to the locked condition. It has been determined that this configuration has virtually eliminated the risk of inadvertent loosening of the torque nut 102, as will subsequently be described.

In use, the nut assembly 100 is threaded onto a bolt shank (not shown). Torque in the tightening direction may be applied on the torque nut 102, with the lock nut 104 being caused to follow the torque nut 102 as a result of the interengagement of the unlocking stops 130 and 132 defined by the shoulders 126 and 128, respectively (see FIG. 9). As indicated above, the nuts 102 and 104 may alternatively be screwed onto the bolt by applying torque in a tightening direction against the lock nut 104, with the torque nut 102 being caused to simultaneously rotate with the lock nut 104 via the interconnection between the detent 110 and recess 106. In any case, once the face 118 of the torque nut 102 engages the structure (not shown) to which the fastener is attached, the fastener is pretensioned preferably by applying a torsional load directly on the torque nut. At this stage of installation, the nuts 102 and 104 are disposed as shown in FIG. 14a, with the lock nut 104 in its unlocked condition such that the lock nut thread axis 134 is substantially aligned with the bolt thread axis 136. The lock nut 104 may subsequently be rotated in a tightening direction (i.e., in a clockwise direction viewing FIGS. 14a–14c) past the maximum interference condition (shown in FIG. 14b) to the locked condition (shown in FIG. 14c). Although not shown in detail, it will be appreciated that there is sufficient spacing between the shoulder faces 114 and 120 and the complemental body faces 116 and 122 for allowing rotation of the lock nut 104 in the tightening direction toward the torque nut 102. This spacing may be provided simply by sufficiently separating the nuts 102 and 104 when they are initially threaded onto the bolt, although the spacing of the nuts 102 and 104 must not be too great or the wedging stresses between the shoulder faces 114 and 120 and the body faces 116 and 122 will not be produced.

Figure 9:
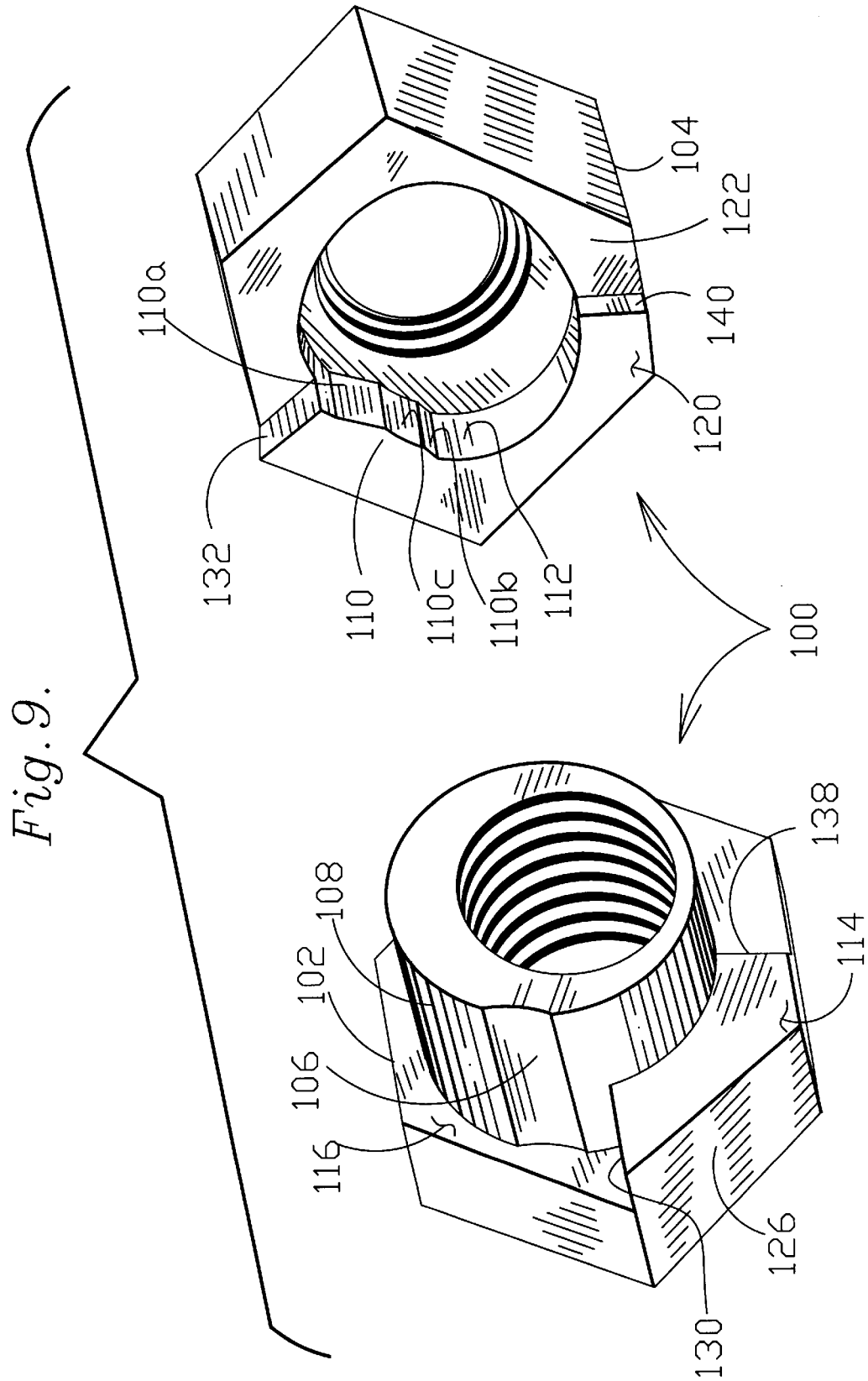
FIG. 9 is a perspective view of a nut assembly, including a torque nut and a lock nut, according to a, second embodiment of the present invention.

Similar to the first embodiment, rotational movement of the lock nut 104 from the locked condition is restricted in the loosening direction by the relatively higher jamming stress generated at the maximum interference condition, and in the tightening direction by interengagement of the locking stops 138 and 140 defined by the shoulders 126 and 128 (see FIG. 9). In fact, any vibrational or shock loading urging the lock nut 104 in the tightening direction will similarly urge the torque nut 102 in the tightening direction to thereby enhance the locking power of the fastener. With rotation of the lock nut 104 relative to the torque nut 102 being restricted, the misalignment of the lock nut thread axis 134 and bolt thread axis 136 is maintained to thereby restrict rotation of the lock nut 104 relative to the bolt (not shown). In addition, the torque nut 102 is prevented from rotating relative to the lock nut 104 when the latter is in the locked condition. Particularly, the torque nut 102 is not able to rotate in a loosening direction (i.e., in a counter-clockwise direction when viewing FIGS. 14a and 14c) relative to the lock nut 104 because of the interengagement of the locking stops 138 and 140. Furthermore, any vibrational or shock loading causing rotation of the torque nut 102 in a tightening direction only enhances the locking power of the fastener. This enhancement of the locking power occurs not only because the pretensioning load of the fastener is increased, but also because the cam surface 108 is caused to rotate relative to the cam surface 112 such that the interference between the nuts 102 and 104 is increased, thereby increasing the gripping stress generated by the nuts. If such shifting of the torque nut 102 occurs, the lock nut 104 will eventually shift relative to the torque nut 102 in the tightening direction until the locking stops 138,140 interengage (i.e., the lock nut 104 will return to the locked condition), as a result of the lock nut 104 having a natural tendency to remain in a condition of relatively lower stress. Accordingly, it is unlikely that shifting of the torque nut 102 relative to the lock nut 104 in the tightening direction will cause the lock nut 104 to shift to the unlocked condition.

FIGS. 15–20b depict a third embodiment of the present invention including a nut assembly 200 having a torque nut 202 and lock nut 204 similar to the first and second embodiments previously described. As will be apparent from the following description, the nut assembly 200 has a construction that is relatively less complex than the first and second embodiments, but does not provide all of the advantages noted hereinabove.

Figure 17:
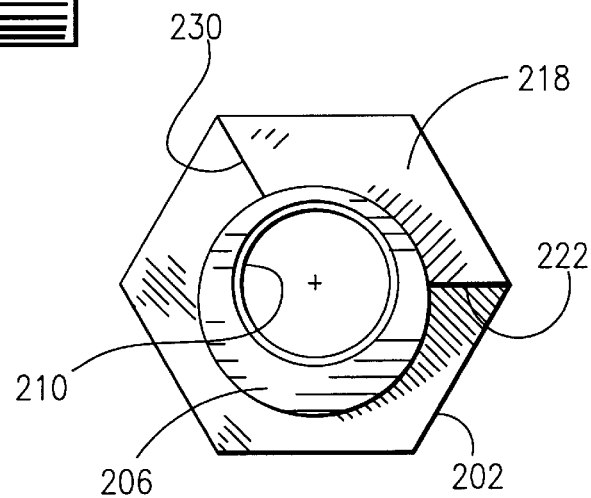
FIG. 17 is a relatively reduced end elevational view of the torque nut shown in FIG. 15.
Figure 18:
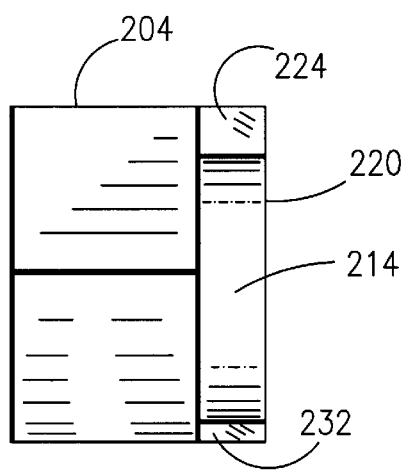
FIG. 18 is a relatively reduced side elevational view of the lock nut shown in FIG. 15.
Figure 19:
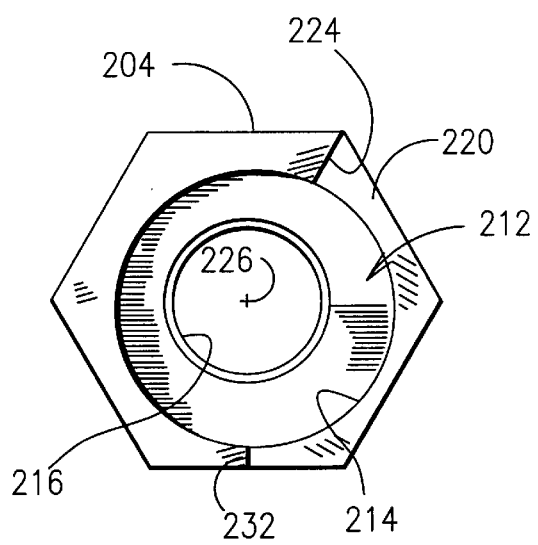
FIG. 19 is a relatively reduced end elevational view of the lock nut shown in FIG. 15.
Figure 20:
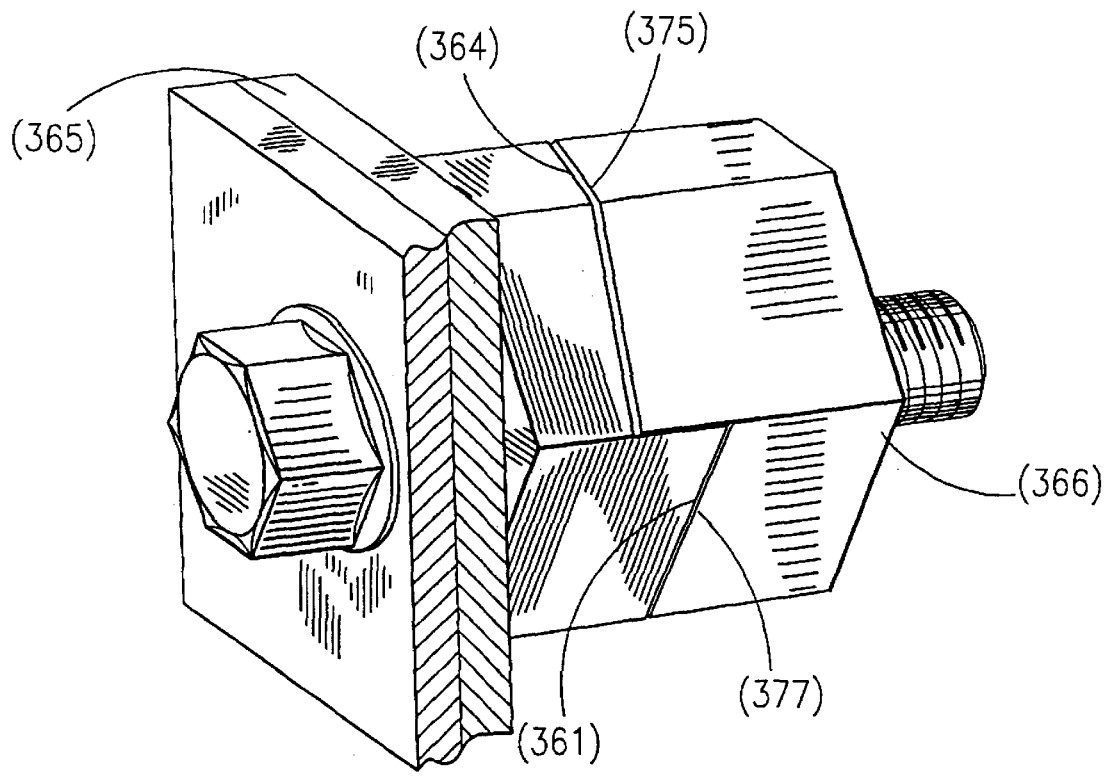
FIG. 20a is a cross-sectional view of a fastener including the nut assembly shown in FIG. 15, particularly illustrating the lock nut in the unlocked condition.
FIG. 20b is a cross-sectional view of the fastener similar to FIG. 20a, but illustrating the lock nut in the locked condition with its thread axis misaligned relative to the bolt thread axis.
Figure 20:
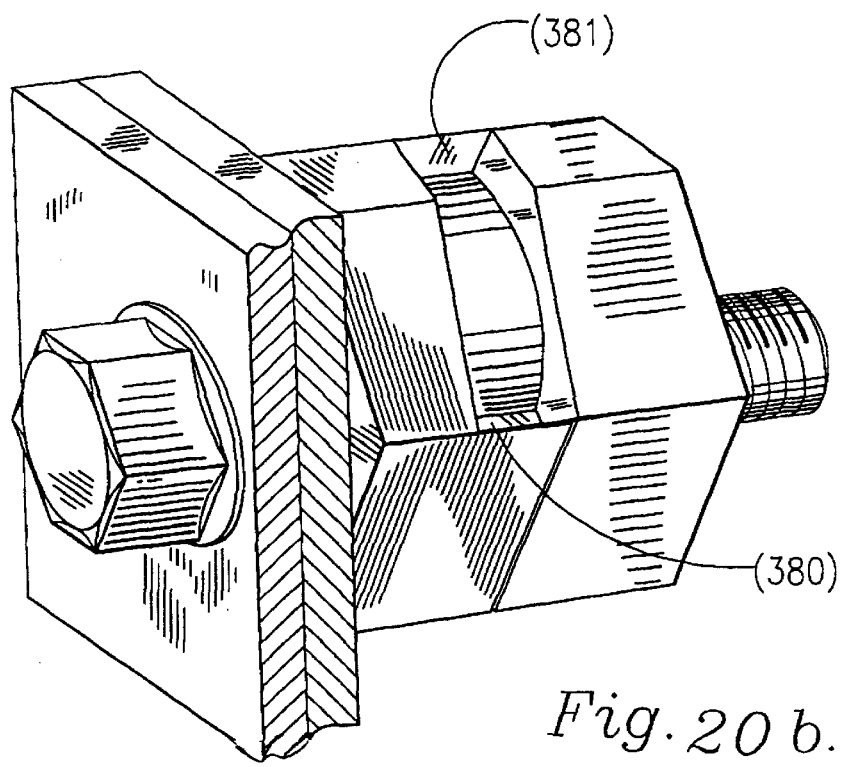
Figure 23:
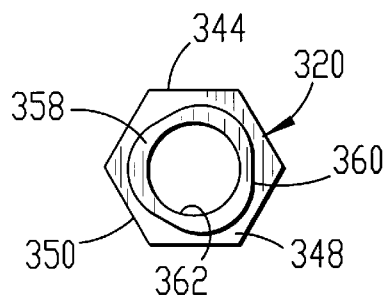
FIG. 23 is an end elevational view of the locking collar of the fourth embodiment.
Figure 24:
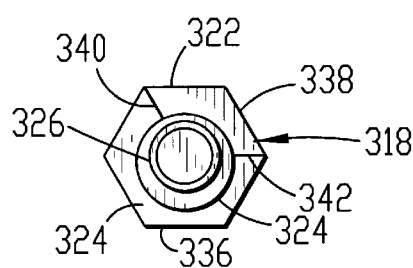
FIG. 24 is an end elevational view of the bolt of the fourth embodiment.
Figure 25:
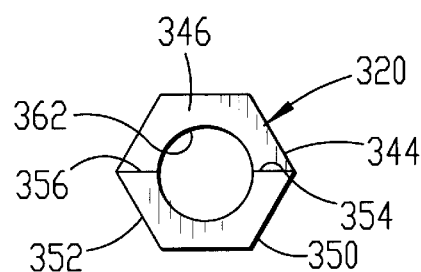
FIG. 25 is an opposite end elevational view of the locking collar shown in FIG. 23.
Figure 26:
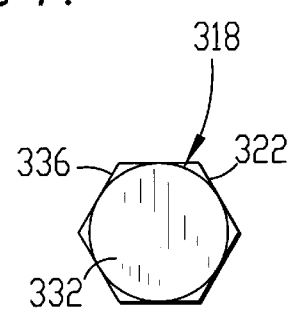
FIG. 26 is an opposite end elevational view of the bolt shown in FIG. 24.

Similar to the first and second embodiments, the torque nut 202 includes an eccentric projection 206 defining a cylindrically shaped cam surface 208 that is eccentric to the internally threaded opening 210 (see FIGS. 15 and 17). On the other hand, the lock nut 204 includes a cylindrical counterbore 212 having a cylindrically-shaped cam surface 214 that is eccentric relative to the internally threaded opening 216. As will be subsequently described, the shoulders 218 and 220 are arranged similar to the second embodiment in the sense that the lock nut 204 rotates in a tightening direction relative to the torque nut 202 toward the locked condition.

In use, the nut assembly 200 is threaded onto a bolt (not shown) with the unlocking stops 222 and 224 (e.g., see FIG. 15) of the nuts 202 and 204 interengaged and the eccentric projection 206 received in the counterbore 212 as shown in FIG. 20a. If desired, the nuts 202 and 204 may be simultaneously screwed along the bolt shank by applying torque in the tightening direction on the torque nut 202. Similar to the second embodiment, such torsional loading on the torque nut 202 is transferred to the lock nut 204 via interengagement of the unlocking stops 222 and 224. A fastener including the nut assembly 200 is preferably pretensioned in the usual manner as indicated in the descriptions of the first and second embodiments. Thereafter, the lock nut 204 may be rotated in a tightening direction relative to the torque nut 202 to a locked condition, as shown in FIG. 20b.

The cam surfaces 208 and 214 of the nuts 202 and 204 progressively interengage one another as the lock nut 204 rotates to the locked condition. Once the lock nut 204 reaches the locked condition, the cam surfaces 208 and 214 have caused the lock nut thread axis 226 to be sufficiently misaligned relative to the bolt thread axis 228 to restrict rotation of the lock nut 204 relative to the bolt (not shown). However, the lock nut 204 does not move past a maximum interference condition, as noted above, during movement between the unlocked and locked conditions. That is to say, the nuts 202 and 204 do not generate a jamming stress that is relatively higher than the gripping stress generated at the locked condition. Accordingly, because the lock nut 204 does not encounter a relatively higher jamming stress as it returns to the unlocked condition, the lock nut 204 does not have the natural tendency to remain in the locked condition, as noted above with respect to the first and second embodiments. Nonetheless, rotation of the lock nut 204 relative to the torque nut 202 in a loosening direction (i.e., in a counter-clockwise direction when viewing FIGS. 20b) is restricted by the gripping stress generated by the nuts 202 and 204 generally at the cam surfaces 208 and 214 when the lock nut 204 is in the locked condition. Rotation of the lock nut 204 relative to the torque nut 202 in the tightening direction is restricted by interengagement of the locking stops 230 and 232 and only enhances the locking power of the fastener.

Rotation of the torque nut 202 relative to the lock nut 204 is restricted by the pretension load of the fastener. Similar to the second embodiment, rotation of the torque nut in a loosening direction (i.e., in a counter-clockwise direction when viewing FIG. 20b) is further restricted by abutting interengagement of the locking stops 230 and 232. Because the lock nut 204 is restricted from rotating relative to the bolt (not shown), the torque nut 202 is consequently restricted from rotating relative to the bolt, even though the torque nut 202 thread axis is substantially aligned with the bolt thread axis when the lock nut is in the locked condition. Rotation of the torque nut 202 relative to the lock nut 204 in the tightening direction enhances the locking power, as noted above with respect to the second embodiment.

Figure 27:
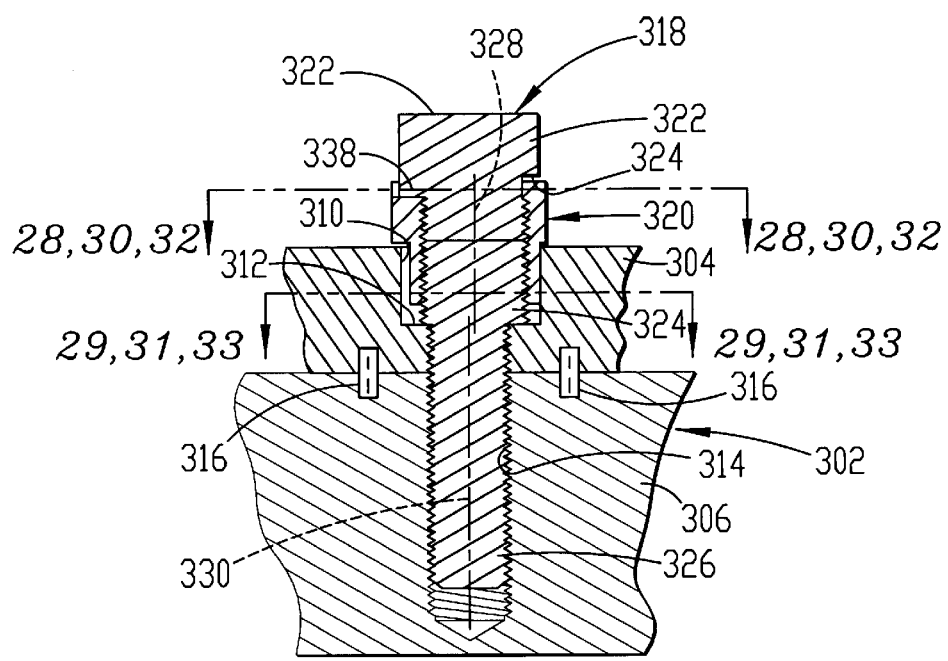
FIG. 27 is a cross-sectional view of the fastener attached to the structure, particularly illustrating the locking collar in its locked position.

FIGS. 21–33 illustrate a fourth embodiment of the present invention. Although the fourth embodiment does not include a nut assembly as set forth in the first three embodiments, this embodiment does incorporate, among other things, the principle of utilizing a camming action to securely lock a fastener in a fastened condition. The fourth embodiment comprises a screw-type fastener 300 that is used with a structure 302 specifically prepared for allowing attachment of the fastener 300 thereto. In the illustrated embodiment, the fastener 300 is utilized to fasten an upper plate 304 to a lower plate 306, although the principles of the present invention should not be limited to such an application (see FIGS. 21 and 27). Extending inwardly from the top of the upper plate 304 is a cylindrically-shaped counterbore 308 defined by a wall 310 and an endmost floor 312. An internally threaded hole 314 projects from the floor 312 of the counterbore 308 and extends into the lower plate 306. It will be noted that the counterbore 308 and hole 314 are concentric. If desired, alignment pins 316 may be provided between the plates 304 and 306 to ensure such concentricity.

The fastener 300 generally includes a bolt 318 and a locking collar 320. As will subsequently be described, the locking collar 320 is shiftable between a locked position in which the collar is wedged between the bolt and the wall 310 of the counterbore 308 for producing a wedging stress that restricts rotation of the bolt 318 relative to the structure 302, and an unlocked position in which the locking collar 320 remains substantially disengaged from the wall 310 of the counterbore 308 so that the bolt 318 may rotate freely relative to the structure 302.

The bolt 318 includes a polygonal head 322, a cylindrically-shaped, externally threaded neck 324 projecting from the head 322, and a cylindrically-shaped, externally threaded shank 326 projecting from the neck 324. As perhaps best shown in FIG. 24, the geometrical centers of the head 322 and shank 326 are aligned, however, the neck 324 is eccentric with respect to the shank 326. Consequently, the neck thread axis represented by the line 328 in FIG. 27 and the shank thread axis represented by the line 330 are offset relative to one another. Additionally, the neck 324 is substantially larger than the shank 326, and a face 331 consequently extends between the outer diameters of the neck 324 and shank 326 (see FIGS. 22 and 24). The bolt head 322 has opposite, flat faces 332 and 334 and a six-sided exterior surface 336 extending between the faces 332 and 334. The head 322 further includes a shoulder 338 projecting from the face 334 along two sides of the head to define an unlocking stop 340 and a locking stop 342.

The locking collar 320 includes a polygonal body 344 having opposite, flat faces 346 and 348 and a six-sided exterior surface 350 extending between the faces 346 and 348. As perhaps best shown in FIG. 21, a shoulder 352 projects from the face 346 along substantially three sides of the body 344 to define an unlocking stop 354 and a locking stop 356. A generally triangular-shaped projection 358 extends from the face 348 of the body 344 and presents an outer surface 360. It will be noted from FIG. 23 that the projection 358 is not centered relative to the geometry of the face 348. An internally threaded opening 362 extends through the body 344 and the projection 358. The opening 362 is configured for threadable interengagement with the neck 324.

Figure 28:
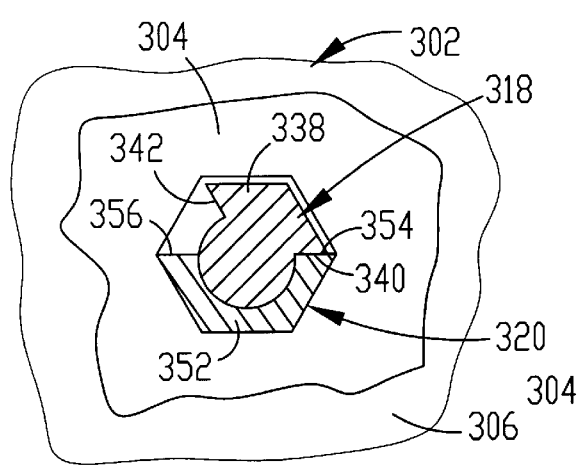
FIG. 28 is a cross-sectional view of the fastener taken along line 28—28 of FIG. 27, particularly illustrating the locking collar in the unlocked position and the unlocking stops of the bolt and collar abuttingly interengaged.
Figure 29:
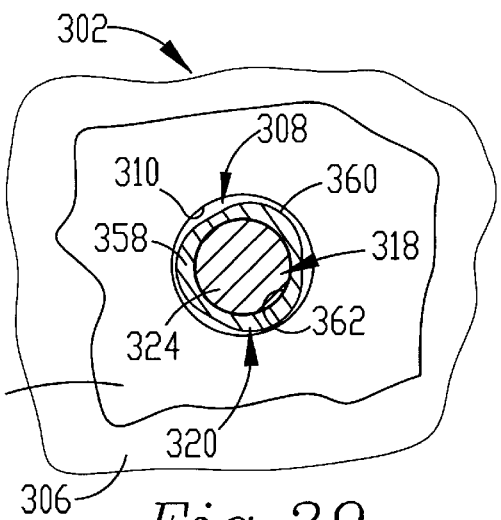
FIG. 29 is a cross-sectional view of the fastener taken along line 29—29 of FIG. 27 with the locking collar in the same position shown in FIG. 28, particularly illustrating the locking collar being disengaged from the wall of the counterbore.
Figure 30:
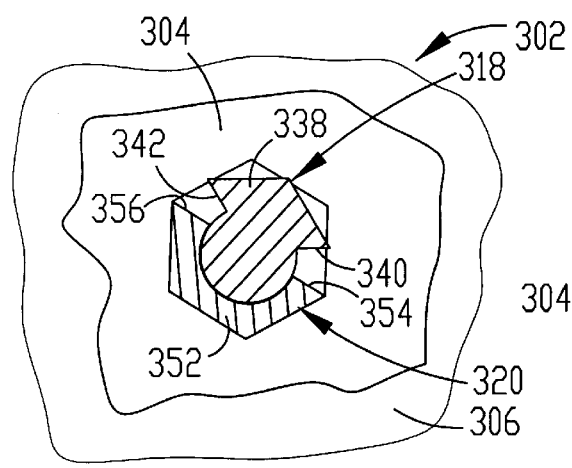
FIG. 30 is a cross-sectional view of the fastener taken along the same line as FIG. 28, but illustrating the locking collar located between the locked and unlocked positions.
Figure 31:
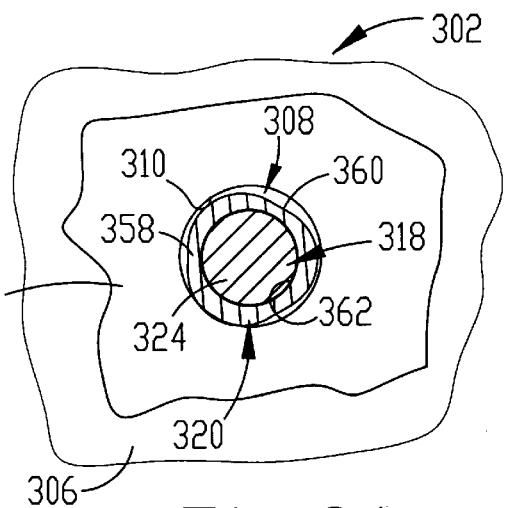
FIG. 31 is a cross-sectional view of the fastener taken along the same line as FIG. 29 with the locking collar in the same position shown in FIG. 30, particularly illustrating the locking collar at its maximum interference with the wall of the counterbore and the neck of the bolt.

In use, the shank 326 is first inserted through the opening 362 of the locking collar 320, with the shoulder 352 of the collar 320 directed toward the bolt head 322, and then the locking collar is threaded onto the neck 324 until the unlocking stops 340 and 354 interengage (as shown in FIG. 28). This relationship of the locking collar 320 relative to the bolt 318 will be referred to as the unlocked position of the collar 320. The fastener 300 may then be attached to the structure 302 by threading the shank 326 into the hole 314. Even though the neck 324 of the bolt 318 is eccentric with respect to the shank 326, the locking collar 320 is arranged relative to the neck 324, when in the unlocked position, in such a manner as to avoid contact with the wall 310 of the counterbore 308 (see FIG. 29). Accordingly, the bolt 318 is able to rotate freely into and out of the hole 314 when the locking collar is in the unlocked position. The face 331 defined at the end of the neck 324 will eventually engage the floor 312 of the counterbore 308, and the bolt 318 may thereafter be pretensioned within the structure 302 by further application of torque in the tightening direction.

Figure 32:
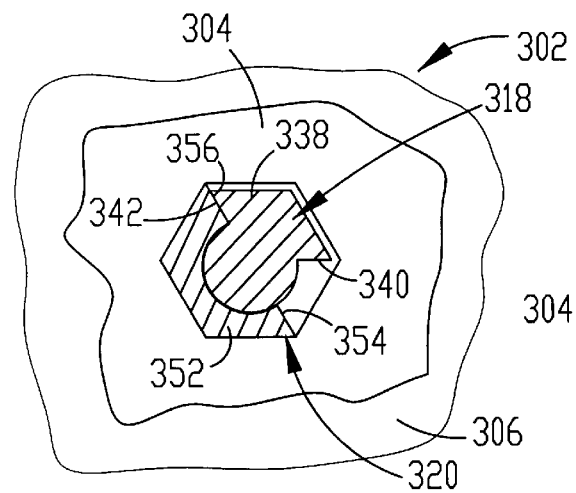
FIG. 32 is a cross-sectional view of the fastener taken along the same line as FIGS. 28 and 30, but illustrating the locking collar in the locked position and the locking stops of the bolt and collar abuttingly interengaged.
Figure 33:
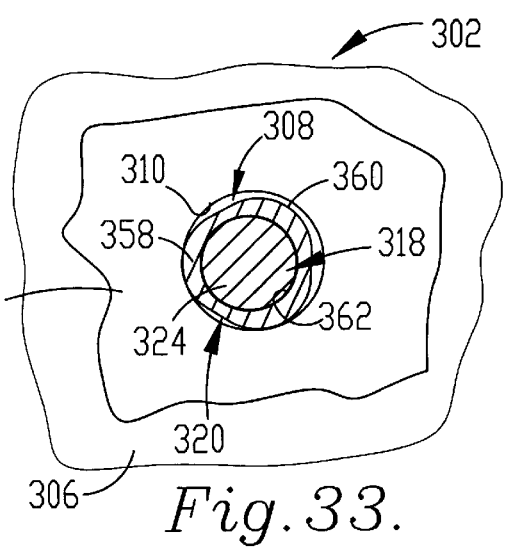
FIG. 33 is a cross-sectional view of the fastener taken along the same line as FIGS. 29 and 31 with the locking collar in the same position shown in FIG. 32, particularly illustrating the locking collar interengaged with the wall of the counterbore and the neck of the bolt.

To securely lock the bolt 318 in its preloaded condition, the locking collar 320 is subsequently rotated in a clockwise direction relative to the neck 324 to the locked position shown in FIGS. 32 and 33. When the locking collar 320 is in the locked position, it has sufficiently wedged between the wall 310 of the counterbore 308 and the neck 324 of the bolt 3 18 to generate a wedging stress that restricts rotation of the bolt 318 relative to the structure 302. If desired, the locking collar 320, the bolt neck 324, and the wall 310 of the counterbore may be designed so that each component elastically deforms along the contacting surfaces. At the very least, the wedging stress is defined by the frictional interengagement of the locking collar 320 between the bolt neck 324 and the counterbore wall 310. Similar to the first and second embodiments described hereinabove, the locking collar 320 passes a maximum interference condition (shown in FIGS. 30 and 31) which generates a jamming stress that is greater in magnitude than the wedging stress generated at the locked position. Accordingly, the locking collar 320 is not likely to rotate in a counter-clockwise direction out of the locked position because of its natural tendency to remain at a relatively lower stress level (i.e., to remain in the locked position). Rotation of the locking collar 320 relative to the bolt 318 in a clockwise direction is limited by the interengagement of the locking stops 342 and 356. Furthermore, such rotation serves to urge the bolt 318 in a tightening direction, which only enhances the locking power of the fastener 300. Along these lines, rotation of the bolt 318 relative to the locking collar 320 in a loosening direction (i.e., in a counterclockwise direction when viewing FIGS. 32 and 33) is restricted by the stops 342 and 356. Again, simultaneous rotation of the bolt 318 and locking collar 320, when the collar is in its locked position, is restricted by the wedging and jamming stresses noted above.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A nut assembly for use with an externally threaded bolt presenting a bolt thread axis, said nut assembly comprising:
   a first member including a first cam surface and a first opening for receiving the bolt; and
   a second locking member including a second cam surface and an internally threaded second opening for threadably receiving the bolt, with the second opening presenting a locking member thread axis,
   at least one of said first and second cam surfaces having a non-circular cross-sectional shape,
   said first and second cam surfaces being configured to shift the locking member, as the members move relative to one another, between an unlocked condition in which the locking member thread axis and the bolt thread axis are substantially aligned, and a locked condition in which the locking member thread axis is misaligned relative to the bolt thread axis so as to restrict rotation of the locking member relative to the bolt.

2. A nut assembly as claimed in claim 1,
   said first member and said locking member interengaging one another along the first and second cam surfaces in such a manner that a gripping stress is generated by the members when the locking member is in the locked condition.

3. A nut assembly as claimed in claim 2,
   said first member and said locking member interengaging one another along the first and second cam surfaces in such a manner that a jamming stress is generated by the members when the locking member is located between the locked and unlocked conditions,
   said jamming stress being greater than the gripping stress.

4. A nut assembly as claimed in claim 3,
   at least one of said first and second cam surfaces being substantially elastically deformed by the other when the jamming stress is generated.

5. A nut assembly for use with an externally threaded bolt presenting a bolt thread axis, said nut assembly comprising:
   a first member including a first cam surface and a first opening for receiving the bolt; and
   a second locking member including a second cam surface and an internally threaded second opening for threadably receiving the bolt, with the second opening presenting a locking member thread axis,
   said first and second cam surfaces being configured to shift the locking member, as the members move relative to one another, between an unlocked condition in which the locking member thread axis and the bolt thread axis are substantially aligned, and a locked condition in which the locking member thread axis is misaligned relative to the bolt thread axis so as to restrict rotation of the locking member relative to the bolt,
   said first member and said locking member interengaging one another along the first and second cam surfaces in such a manner that a gripping stress is generated by the members when the locking member is in the locked condition,
   said first member and said locking member interengaging one another along the first and second cam surfaces in such a manner that a jamming stress is generated by the members when the locking member is located between the locked and unlocked conditions,
   said jamming stress being greater than the gripping stress, at least one of said first and second cam surfaces being substantially elastically deformed by the other when the jamming stress is generated, said locking member rotating relative to the first member in one direction as it shifts from the unlocked condition to the locked condition and in a generally opposite direction as it shifts from the locked condition to the unlocked condition, said first member and said locking member including respective locking stops which cooperatively restrict rotation of the locking member in the one direction beyond the locked condition.

6. A nut assembly as claimed in claim 5, said first opening of the first member being internally threaded for threadably receiving the bolt, with the first opening presenting a first member thread axis, said one direction of rotation of the locking member corresponding with rotation of the first member in a tightening direction relative to the bolt.

7. A nut assembly as claimed in claim 6, said first member and said locking member including respective unlocking stops which cooperatively restrict rotation of the locking member in the opposite direction beyond the unlocked condition.

8. A nut assembly as claimed in claim 7, one of said cam surfaces including a detent and the other of the cam surfaces including a recess for receiving the detent when the locking member is in the unlocked condition.

9. A nut assembly as claimed in claim 7, said first cam surface having a generally cylindrical shape that is eccentric relative to the first member thread axis, said locking member including a counterbore that defines the second cam surface.

10. A nut assembly as claimed in claim 1, said first member and the locking member each having a polygonal-shaped exterior surface.

11. A nut assembly for use with an externally threaded bolt presenting a bolt thread axis, said nut assembly comprising:

a first member including a first cam surface and a first opening for receiving the bolt; and a second locking member including a second cam surface and an internally threaded second opening for threadably receiving the bolt, with the second opening presenting a locking member thread axis, said first and second cam surfaces being configured to shift the locking member, as the members move relative to one another, between an unlocked condition in which the locking member thread axis and the bolt thread axis are substantially aligned, and a locked condition in which the locking member thread axis is misaligned relative to the bolt thread axis so as to restrict rotation of the locking member relative to the bolt, said locking member rotating relative to the first member in one direction as it shifts from the unlocked condition to the locked condition and in a generally opposite direction as it shifts from the locked condition to the unlocked condition, said first member and said locking member including respective locking stops which cooperatively restrict rotation of the locking member in the one direction beyond the locked condition.

12. A nut assembly as claimed in claim 11, said first opening of the first member being internally threaded for threadably receiving the bolt, said one direction of rotation of the locking member corresponding with rotation of the first member in a tightening direction relative to the bolt.

13. A nut assembly as claimed in claim 12, said first member and said locking member including respective unlocking stops which cooperatively restrict rotation of the locking member in the opposite direction beyond the unlocked condition.

14. A nut assembly for use with an externally threaded bolt presenting a bolt thread axis, said nut assembly comprising:

a first member including a first cam surface and a first opening for receiving the bolt; and a second locking member including a second cam surface and an internally threaded second opening for threadably receiving the bolt, with the second opening presenting a locking member thread axis, said first and second cam surfaces being configured to shift the locking member, as the members move relative to one another, between an unlocked condition in which the locking member thread axis and the bolt thread axis are substantially aligned, and a locked condition in which the locking member thread axis is misaligned relative to the bolt thread axis so as to restrict rotation of the locking member relative to the bolt, one of said cam surfaces including a detent and the other of the cam surfaces including a recess for receiving the detent when the locking member is in the unlocked condition.

15. A nut assembly as claimed in claim 1, said first member and said locking member cooperatively presenting at least one pair of opposed faces configured to progressively interengage as the locking member shifts from the unlocked condition to the locked condition.

16. A nut assembly as claimed in claim 15, said faces being substantially flat and presenting opposite yet substantially equal angles of inclination relative to a common plane projecting normally from the bolt thread axis, when the nut assembly receives the bolt.

17. A nut assembly as claimed in claim 1, said second cam surface having a generally triangular cross-sectional shape.

18. A fastener comprising:

a bolt having an externally threaded, elongated shank that presents a bolt thread axis;

a first member including a first cam surface and a first opening receiving the shank, a second locking member including a second cam surface and an internally threaded second opening threadably receiving the shank, with the second opening presenting a locking member thread axis, at least one of said first and second cam surfaces having a non-circular cross-sectional shape, said first and second cam surfaces being configured to shift the locking member, as the members move relative to one another, between an unlocked condition in which the locking member thread axis and the bolt thread axis are substantially aligned, and a locked condition in which the locking member thread axis is misaligned relative to the bolt thread axis so as to restrict rotation of the locking member relative to the bolt.

19. A fastener as claimed in claim 18, said first member and said locking member interengaging one another along the first and second cam surfaces in such a manner that a gripping stress is generated by the members when the locking member is in the locked condition.

20. A fastener as claimed in claim 19, said first member and said locking member interengaging one another along the first and second cam surfaces in such a manner that a jamming stress is generated by the members when the locking member is located between the locked and unlocked conditions, said jamming stress being greater than the gripping stress.

21. A fastener as claimed in claim 20, at least one of said first and second cam surfaces being substantially elastically deformed by the other when the jamming stress is generated.

22. A fastener comprising:

a bolt having an externally threaded, elongated shank that presents a bolt thread axis, a first member including a first cam surface and a first opening receiving the shank;

a second locking member including a second cam surface and an internally threaded second opening threadably receiving the shank, with the second opening presenting a locking member thread axis, said first and second cam surfaces being configured to shift the locking member, as the members move relative to one another, between an unlocked condition in which the locking member thread axis and the bolt thread axis are substantially aligned, and a locked condition in which the locking member thread axis is misaligned relative to the bolt thread axis so as to restrict rotation of the locking member relative to the bolt, said first member and said locking member interengaging one another along the first and second cam surfaces in such a manner that a gripping stress is generated by the members when the locking member is in the locked condition, said first member and said locking member interengaging one another along the first and second cam surfaces in such a manner that a jamming stress is generated by the members when the locking member is located between the locked and unlocked conditions, said jamming stress being greater than the gripping stress, at least one of said first and second cam surfaces being substantially elastically deformed by the other when the jamming stress is generated, said locking member rotating relative to the first member in one direction as it shifts from the unlocked condition to the locked condition and in a generally opposite direction as it shifts from the locked condition to the unlocked condition, said first member and said locking member including respective locking stops which cooperatively restrict rotation of the locking member in the one direction beyond the locked condition.

23. A fastener as claimed in claim 22, said first opening of the first member being internally threaded for threadably receiving the bolt, with the first opening presenting a first member thread axis, said one direction of rotation ofthe locking member corresponding with rotation of the first member in a tightening direction relative to the bolt.

24. A fastener as claimed in claim 23, said first member and said locking member including respective unlocking stops which cooperatively restrict rotation of the locking member in the opposite direction beyond the unlocked condition.

25. A fastener as claimed in claim 24, one of said cam surfaces including a detent and the other of the cam surfaces including a recess for receiving the detent when the locking member is in the unlocked condition.

26. A fastener as claimed in claim 24, said first cam surface having a generally cylindrical shape that is eccentric relative to the first member thread axis, said locking member including a counterbore that defines the second cam surface.

27. A fastener as claimed in claim 18, said bolt including a head at one end of the shank, said head of the bolt, the first member and the locking member each having a polygonal-shaped exterior surface.

28. A fastener comprising:

a bolt having an externally threaded, elongated shank that presents a bolt thread axis;

a first member including a first cam surface and a first opening receiving the shank;

a second locking member including a second cam surface and an internally threaded second opening threadably receiving the shank, with the second opening presenting a locking member thread axis, said first and second cam surfaces being configured to shift the locking member, as the members move relative to one another, between an unlocked condition in which the locking member thread axis and the bolt thread axis are substantially aligned, and a locked condition in which the locking member thread axis is misaligned relative to the bolt thread axis so as to restrict rotation of the locking member relative to the bolt, said locking member rotating relative to the first member in one direction as it shifts from the unlocked condition to the locked condition and in a generally opposite direction as it shifts from the locked condition to the unlocked condition, said first member and said locking member including respective locking stops which cooperatively restrict rotation of the locking member in the one direction beyond the locked condition.

29. A fastener as claimed in claim 28, said first opening of the first member being internally threaded for threadably receiving the bolt, said one direction of rotation ofthe locking member corresponding with rotation of the first member in a tightening direction relative to the bolt.

30. A fastener as claimed in claim 29, said first member and said locking member including respective unlocking stops which cooperatively restrict rotation of the locking member in the opposite direction beyond the unlocked condition.

31. A fastener as claimed in claim 30, one of said cam surfaces including a detent and the other of the cam surfaces including a recess for receiving the detent when the locking member is in the unlocked condition.

32. A fastener as claimed in claim 15, said first member and said locking member cooperatively presenting at least one pair of opposed faces configured to progressively interengage as the locking member shifts from the unlocked condition to the locked condition.

33. A fastener as claimed in claim 32, said faces being substantially flat and presenting opposite yet substantially equal angles of inclination relative to a common plane projecting normally from the bolt thread axis.

34. A fastener as claimed in claim 15, said second cam surface having a generally triangular cross-sectional shape.

35. A fastener for attachment to a structure having an internally threaded hole extending inwardly from a substantially coaxial counterbore defined by a longitudinal wall and an endmost floor, said fastener comprising:

a bolt including a head, an externally threaded shank, and a neck between the head and the shank such that the neck is located generally within the counterbore when the shank is threadably received within the hole; and a locking collar associated with the neck of the bolt for shifting movement between a locked position in which the locking collar is wedged between the neck and the wall of the counterbore for producing a wedging stress that restricts rotation of the bolt, and an unlocked position in which the locking collar remains substantially disengaged from the wall of the counterbore so that the bolt is freely rotatable into and out of the hole.

36. A fastener as claimed in claim 35, said locking collar being configured to interengage the neck of the bolt and the wall of the counterbore in such a manner that a jamming stress is produced when the locking collar is located between the locked and unlocked positions, said jamming stress being greater than the wedging stress.

37. A fastener as claimed in claim 36, said locking collar including an opening that rotatably receives the neck of the bolt such that the locking collar is rotatable relative to the bolt in a first direction from the unlocked position to the locked position and in a generally opposite second direction from the locked position to the unlocked position, said bolt and said locking collar including respective locking stops which cooperatively restrict rotation of the locking collar in the first direction beyond the locked position.

38. A fastener as claimed in claim 37, said first direction of rotation of the locking collar corresponding with rotation of the bolt in a tightening direction relative to the hole.

39. A fastener as claimed in claim 38, said bolt and said locking collar including respective unlocking stops which cooperatively restrict rotation of the locking collar in the opposite direction beyond the unlocked position.

40. A fastener as claimed in claim 39, said neck of the bolt being externally threaded, and said opening of the locking collar being internally threaded for threadably receiving the neck of the bolt.

41. A fastener as claimed in claim 40, said shank presenting a shank thread axis, and said neck presenting a neck thread axis that is offset from the shank thread axis such that the neck is eccentric relative to the shank.

42. A fastener as claimed in claim 41, said locking collar further including a wedging surface spaced outwardly from the opening and configured to engage the wall of the counterbore, said wedging surface having a generally triangular shape.

43. A fastener as claimed in claim 42, said head of the bolt and the locking collar each having a polygonal-shaped exterior surface.

* * * * *